US012755970B2

(12) United States Patent
Lee et al.

(10) Patent No.: US 12,755,970 B2
(45) Date of Patent: Oct. 6, 2026

(54) RECHARGEABLE LITHIUM BATTERY WITH AN IMPROVED ε-$VOPO_4$ CATHODE, AND APPLICATIONS THEREOF

(71) Applicant: The Research Foundation for The State University of New York, Binghamton, NY (US)

(72) Inventors: Krystal Lee, Binghamton, NY (US); Carrie Siu, Darien, IL (US); Fengxia Xin, Vestal, NY (US); M. Stanley Whittingham, Vestal, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 400 days.

(21) Appl. No.: 18/447,278

(22) Filed: Aug. 9, 2023

(65) Prior Publication Data

US 2024/0006612 A1 Jan. 4, 2024

Related U.S. Application Data

(60) Continuation-in-part of application No. 18/354,493, filed on Jul. 18, 2023, now Pat. No. 12,002,957, (Continued)

(51) Int. Cl.

| | |
|---|---|
| ***H01M 4/58*** | (2010.01) |
| ***C01B 25/37*** | (2006.01) |

(Continued)

(52) U.S. Cl.
CPC ......... *H01M 4/5825* (2013.01); *C01B 25/372* (2013.01); *H01M 4/136* (2013.01); *H01M 4/1397* (2013.01); *H01M 4/623* (2013.01); *H01M 4/625* (2013.01); *H01M 10/0525* (2013.01); *C01P 2002/72* (2013.01);
(Continued)

(58) Field of Classification Search
CPC ............... H01M 4/136; H01M 4/5825; H01M 2004/021; H01M 2004/028; H01M 10/0525; C01B 25/372
See application file for complete search history.

(56) References Cited

U.S. PATENT DOCUMENTS 3,255,211 A 6/1966 Kerr
3,255,212 A 6/1966 Kerr
(Continued)

*Primary Examiner* — Brittany L Raymond
(74) *Attorney, Agent, or Firm* — Hoffberg & Associates; Steven Hoffberg

(57) ABSTRACT

A lithium battery with an improved cathode. The cathode comprises the epsilon polymorph of vanadyl phosphate, ε-$VOPO_4$, made from solvothermally synthesized $H_2VOPO_4$, and optimized to reversibly intercalate two Li-ions to reach full theoretical capacity with a coulombic efficiency of 98%. This material adopts a stable 3D tunnel structure and can extract two Li-ions per vanadium ion, giving a theoretical capacity of 305 mAh/g, with an upper charge/discharge plateau at around 4.0 V, and one lower at around 2.5 V The ε-VOPO4 particles may be modified with niobium (Nb) to improve the cycling stability.

21 Claims, 30 Drawing Sheets

Related U.S. Application Data which is a continuation of application No. 17/670,470, filed on Feb. 13, 2022, now Pat. No. 11,715,829, which is a division of application No. 16/291,617, filed on Mar. 4, 2019, now Pat. No. 11,251,430.

(60) Provisional application No. 62/638,893, filed on Mar. 5, 2018.

(51) Int. Cl.

| | |
|---|---|
| ***H01M 4/02*** | (2006.01) |
| ***H01M 4/136*** | (2010.01) |
| ***H01M 4/1397*** | (2010.01) |
| ***H01M 4/62*** | (2006.01) |
| ***H01M 10/0525*** | (2010.01) |

(52) U.S. Cl.

CPC ...... *C01P 2002/90* (2013.01); *C01P 2004/03* (2013.01); *C01P 2004/04* (2013.01); *H01M 2004/021* (2013.01); *H01M 2004/028* (2013.01)

(56) References Cited

U.S. PATENT DOCUMENTS

| | | | | |
|---|---|---|---|---|
| 3,255,213 | A | 6/1966 | Kerr | |
| 3,351,565 | A | 11/1967 | Kerr | |
| 3,385,796 | A | 5/1968 | Kerr | |
| 3,484,384 | A | 12/1969 | Kerr | |
| 3,867,417 | A | 2/1975 | Gleim | |
| 3,980,585 | A | 9/1976 | Kerr | |
| 4,016,105 | A | 4/1977 | Kerr | |
| 4,049,574 | A | 9/1977 | Kerr | |
| 4,071,539 | A | 1/1978 | Kerr | |
| 4,123,388 | A | 10/1978 | Kerr | |
| 4,179,404 | A | 12/1979 | Barone | |
| 4,382,876 | A | 5/1983 | Neubold | |
| 4,564,603 | A | 1/1986 | Robinson | |
| 4,567,314 | A | 1/1986 | Robinson | |
| 4,599,477 | A | 7/1986 | Robinson | |
| 4,764,498 | A | 8/1988 | Wissner | |
| 4,883,897 | A | 11/1989 | Kiyomiya | |
| 5,045,316 | A | 9/1991 | Kaplan | |
| 5,185,309 | A | 2/1993 | Aono | |
| 5,252,752 | A | 10/1993 | Aono | |
| 6,048,987 | A | 4/2000 | Groke | |
| 6,734,135 | B1 | 5/2004 | Albonetti | |
| 7,790,319 | B2 | 9/2010 | Faulkner | |
| 8,324,376 | B2 | 12/2012 | Binder | |
| 8,449,980 | B2 | 5/2013 | Suzuki | |
| 9,077,037 | B2 | 7/2015 | Hwu | |
| 10,840,505 | B2 | 11/2020 | Zarra et al. | |
| 11,145,863 | B2 | 10/2021 | Komaba | |
| 12,027,691 | B2 | 7/2024 | Bodoin | |
| 12,100,828 | B2 | 9/2024 | Sadoway | |
| 2004/0014990 | A1 | 1/2004 | Storck | |
| 2004/0262571 | A1 | 12/2004 | Barker | |
| 2005/0153834 | A1 | 7/2005 | Weiguny | |
| 2005/0222435 | A1 | 10/2005 | Weiguny | |
| 2005/0222436 | A1 | 10/2005 | Weiguny | |
| 2006/0173197 | A1 | 8/2006 | Ghelfi | |
| 2006/0263688 | A1 | 11/2006 | Guyomard | |
| 2007/0169338 | A1 | 7/2007 | Deschamps | |
| 2008/0044390 | A1 | 2/2008 | Jin | |
| 2008/0227992 | A1 | 9/2008 | Dobner | |
| 2010/0092871 | A1 | 4/2010 | Medlege | |
| 2010/0162909 | A1 | 7/2010 | Lefebvre | |
| 2011/0151317 | A1 | 6/2011 | Giroud | |
| 2012/0114957 | A1 | 5/2012 | Fujibayashi | |
| 2012/0149919 | A1 | 6/2012 | Altwasser | |
| 2013/0052492 | A1* | 2/2013 | Schaefer | H01M 4/362 429/50 |
| 2013/0059211 | A1* | 3/2013 | Schaefer | H01M 4/485 429/50 |
| 2013/0084453 | A1 | 4/2013 | Imokawa | |
| 2013/0171468 | A1 | 7/2013 | Imokawa | |
| 2013/0189590 | A1 | 7/2013 | Jean-Marc | |
| 2013/0273389 | A1 | 10/2013 | Kaneko | |
| 2014/0223740 | A1 | 8/2014 | Matsui | |
| 2014/0234544 | A1 | 8/2014 | Takada | |
| 2015/0013947 | A1 | 1/2015 | Matsui | |
| 2015/0027342 | A1 | 1/2015 | Matsui | |
| 2015/0232634 | A1 | 8/2015 | Yasuda | |
| 2015/0311491 | A1 | 10/2015 | Deschamps | |
| 2015/0311506 | A1 | 10/2015 | Mizuno | |
| 2015/0311520 | A1 | 10/2015 | Mizuno | |
| 2016/0040298 | A1 | 2/2016 | Mizuno | |
| 2016/0060765 | A1 | 3/2016 | Mizuno | |
| 2016/0365577 | A1* | 12/2016 | Zhang | H01M 4/5825 |
| 2017/0233312 | A1 | 8/2017 | Hossain | |
| 2017/0373310 | A1 | 12/2017 | Whittingham | |
| 2018/0115014 | A1 | 4/2018 | Zanotti | |
| 2018/0134910 | A1 | 5/2018 | Umeda | |
| 2018/0171164 | A1 | 6/2018 | Fujita | |
| 2018/0327568 | A1 | 11/2018 | Flapper | |
| 2019/0097210 | A1 | 3/2019 | Chen | |
| 2019/0267664 | A1 | 8/2019 | Lin | |
| 2019/0273257 | A1 | 9/2019 | Siu | |
| 2019/0393467 | A1 | 12/2019 | Guo | |
| 2020/0020895 | A1 | 1/2020 | Collins | |
| 2021/0234231 | A1 | 7/2021 | Zhang | |
| 2021/0242535 | A1 | 8/2021 | Zhang | |
| 2021/0249659 | A1 | 8/2021 | Liu | |
| 2021/0336247 | A1 | 10/2021 | Liu | |
| 2021/0351405 | A1 | 11/2021 | Feng | |
| 2021/0408597 | A1 | 12/2021 | Liu | |
| 2022/0052386 | A1 | 2/2022 | Wang | |
| 2022/0149431 | A1 | 5/2022 | Wenqiang | |
| 2022/0190389 | A1 | 6/2022 | Yushin | |
| 2022/0209241 | A1 | 6/2022 | Li | |
| 2022/0216471 | A1 | 7/2022 | Zhou | |
| 2022/0223835 | A1 | 7/2022 | Wang | |
| 2022/0223836 | A1 | 7/2022 | Zhou | |
| 2022/0223844 | A1 | 7/2022 | Han | |
| 2022/0223851 | A1 | 7/2022 | Yi | |
| 2022/0223859 | A1 | 7/2022 | Zhou | |
| 2022/0223876 | A1 | 7/2022 | Li | |
| 2022/0223975 | A1 | 7/2022 | Wang | |
| 2022/0328840 | A1 | 10/2022 | Jiang | |
| 2022/0328845 | A1 | 10/2022 | Lin | |
| 2022/0344646 | A1 | 10/2022 | Li | |
| 2023/0018070 | A1 | 1/2023 | Ji | |
| 2023/0030305 | A1 | 2/2023 | Soon-Shiong | |
| 2023/0037223 | A1 | 2/2023 | Dong | |
| 2023/0040872 | A1 | 2/2023 | Li | |
| 2023/0043554 | A1 | 2/2023 | Jiang | |
| 2023/0043821 | A1 | 2/2023 | Chen | |
| 2023/0049766 | A1 | 2/2023 | Tang | |
| 2023/0050246 | A1 | 2/2023 | Zhong | |
| 2023/0052908 | A1 | 2/2023 | Jin | |
| 2023/0058850 | A1 | 2/2023 | Zhong | |
| 2023/0100932 | A1 | 3/2023 | He | |
| 2023/0115059 | A1 | 4/2023 | Zhang | |
| 2023/0122728 | A1 | 4/2023 | Zhang | |
| 2023/0125464 | A1 | 4/2023 | Sun | |
| 2023/0163417 | A1 | 5/2023 | Li | |
| 2023/0178797 | A1 | 6/2023 | Roudebush | |
| 2023/0223538 | A1 | 7/2023 | Wang | |
| 2023/0238519 | A1 | 7/2023 | Zhang | |
| 2023/0238520 | A1 | 7/2023 | Xiao | |
| 2023/0238655 | A1 | 7/2023 | Xiao | |
| 2023/0246247 | A1 | 8/2023 | Xiao | |
| 2023/0282836 | A1 | 9/2023 | Zeng | |
| 2023/0307618 | A1 | 9/2023 | Zeng | |
| 2023/0335731 | A1 | 10/2023 | Liu | |
| 2023/0395778 | A1 | 12/2023 | Sun | |
| 2023/0402603 | A1 | 12/2023 | Liu | |
| 2023/0420687 | A1 | 12/2023 | Li | |
| 2024/0006611 | A1 | 1/2024 | Lee | |
| 2024/0006612 | A1 | 1/2024 | Lee | |
| 2024/0021838 | A1 | 1/2024 | Guo | |
| 2024/0030445 | A1 | 1/2024 | Huang | |
| 2024/0030563 | A1 | 1/2024 | Zeng | |

(56) References Cited

U.S. PATENT DOCUMENTS

| | | | |
|---|---|---|---|
| 2024/0047749 | A1 | 2/2024 | Liu |
| 2024/0113275 | A1 | 4/2024 | Zheng |
| 2024/0136535 | A1 | 4/2024 | Du |
| 2024/0162440 | A1 | 5/2024 | Zheng |
| 2024/0178434 | A1 | 5/2024 | Dong |
| 2024/0208837 | A1 | 6/2024 | Zhong |
| 2024/0218209 | A1 | 7/2024 | Hu |
| 2024/0266518 | A1 | 8/2024 | Li |
| 2024/0274801 | A1 | 8/2024 | Jiang |
| 2024/0304784 | A1 | 9/2024 | Liu |
| 2024/0313277 | A1 | 9/2024 | Zou |
| 2024/0339726 | A1 | 10/2024 | Roudebush |
| 2024/0347694 | A1 | 10/2024 | Liao |
| 2024/0347767 | A1 | 10/2024 | Wang |
| 2024/0347820 | A1 | 10/2024 | Li |
| 2024/0347861 | A1 | 10/2024 | Zeng |
| 2024/0372129 | A1 | 11/2024 | Gao |
| 2024/0387858 | A1 | 11/2024 | Jiang |

* cited by examiner

| Samples | V/P | Nb/P | P |
|---|---|---|---|
| Pristine | 0.984 | - | 1 |
| 1.2 mol% | 0.924 | 0.0126 | 1 |
| 3.6 mol% | 0.923 | 0.0368 | 1 |
| 6 mol% | 0.921 | 0.0615 | 1 |

Table 1: ICP-OES Results of Pristine and Nb-Modified ε-$VOPO_4$.

FIG. 18B

RECHARGEABLE LITHIUM BATTERY WITH AN IMPROVED ε-$VOPO_4$ CATHODE, AND APPLICATIONS THEREOF

CROSS REFERENCE TO RELATED APPLICATIONS

The present invention is a Continuation-In-Part of U.S. patent application Ser. No. 18/354,493, Filed Jul. 18, 2023, which is a Continuation of U.S. patent application Ser. No. 17/670,470, filed Feb. 13, 2022, now U.S. Pat. No. 11,715,929, issued Aug. 1, 2023, which is a Division of U.S. patent application Ser. No. 16/291,617, filed Mar. 4, 2019, now U.S. Pat. No. 11,251,430, issued Feb. 15, 2022, which is a Non-Provisional of and claims benefit of priority from U.S. Patent Application No. 62/638,893, filed Mar. 5, 2018, each of which is expressly incorporated herein in its entirety by reference, and this application is a Continuation-In-Part of U.S. patent application Ser. No. 18/030,868, filed Apr. 7, 2023, which is a National Stage Application of U.S. PCT Application PCT/US2021/055328, filed Oct. 16, 2021, which claims the benefit of priority from U.S. Patent Application 63/092,755, filed Oct. 16, 2020, each of which is expressly incorporated herein in its entirety by reference.

STATEMENT OF FEDERALLY FUNDED RESEARCH

This invention was made with government support under contract DE-SC0012583 awarded by the Department of Energy and contract DE-EE0007765 awarded by the Department of Energy. The government has certain rights in the invention.

TECHNICAL FIELD

The present invention relates to a rechargeable lithium battery with an improved ε-$VOPO_4$ cathode, and applications thereof.

BACKGROUND

Lithium-ion batteries dominate the lithium battery market. These batteries use intercalation electrodes, which were discovered by Dr. M. Stanley Whittingham in the 1970s, and Dr. Whittingham patented the world's first lithium metal battery in 1977. While present-day lithium batteries work well, lithium batteries having improved cathodes and improved anodes are still needed.

SUMMARY

The embodiments featured herein include lithium batteries having improved cathodes. In an embodiment, a lithium battery is presented in which a vanadyl phosphates ε-$VOPO_4$ cathode is used that can achieve multi-electron storage. Vanadyl phosphates in general have low intrinsic conductivity. A high efficiency battery cathode has low electrical resistance. In embodiments, to improve conductivity, the cathode material is preferably nanosized, and coated with particles of a low activation energy conductive material, such as graphene or carbon nanotubes. This cathode utilizes the two redox couples of vanadium cation (i.e., $V^{5+}/V^{4+}$, $V^{4+}/V^{3+}$) to permit more than one lithium ion to be stored in the unit structure per vanadium ion. The involvement of the multiple redox processes of vanadium is reflected by the well separated high voltage plateau region at ~3.8 V and low voltage plateau region at ~2 V. The two-electron redox property of vanadium results in a theoretical capacity of 305 mAh/g. In practical, maximum discharge capacity of over 300 mAh/g have been obtained within the voltage region of 1.3-4.5 V vs. $Li/Li^+$, which is over 90% of the theoretical value.

In an embodiment, in addition to ε-$VOPO_4$ material, the cathode may further contain any cathode material suitable for lithium-ion insertion and release. Suitable auxiliary materials may include phosphate-based materials such as $FePO_4$, $VPO_4F$, $V_2(PO_4)_2F_3$, $FePO_4F$, and $V_2(PO_4)_3$; oxides such as $CoO_2$, orthorhombic $MnO_2$, layered iron oxides $FeO_2$, chromium oxide $CrO_2$, layered $Ni_{0.5}Mn_{0.5}O_2$, and $V_6O_{15}$ nanorods; layer sulfides such as $TiS_2$; perovskite transition metal fluorides, or a mixture thereof.

The epsilon polymorph of vanadyl phosphate, ε-$VOPO_4$, made from the hydrothermally or more generally, solvothermally synthesized $H_2VOPO_4$, is a cathode material for lithium-ion batteries that has been optimized to reversibly intercalate two Li-ions to reach the full theoretical capacity with a coulombic efficiency of 98%. This material adopts a stable 3D tunnel structure and can extract two Li-ions per vanadium ion, giving a theoretical capacity of 305 mAh/g, with an upper charge/discharge plateau at around 4.0 V, and one lower at around 2.5 V. As ε-$VOPO_4$ is capable of reversibly intercalating more than one lithium ion into the structure, it stores and delivers more energy than current batteries in the market. Compared to $LiFePO_4$, ε-$VOPO_4$ has a higher electronic conductivity and higher energy density with the insertion of one Li-ion, 159 mAh/g at 4.0 V vs 170 mAh/g at 3.45 V. Overall, ε-$VOPO_4$ is a great candidate for next generation high energy Li-ion batteries. The nano-sized ε-$VOPO_4$ particles demonstrate enhanced electrochemistry and cyclability for potential applications in lithium batteries.

In an embodiment of the present invention, a high energy density cathode active material is provided for use in a lithium battery, using ε-$VOPO_4$ as an active material, and which comprises a conductivity enhancer comprising graphene or carbon nanotubes.

In an embodiment, the ε-$VOPO_4$ particles are modified with niobium (Nb). The Nb-modified particles exhibit an Nb-rich layer on their surface when modified. As the Nb concentration exceeds 3.6 mol %, the unit cell parameters of the modified material deviate from those of unmodified material, indicating some partial Nb substitution by 6 mol % Nb modification. Modification significantly enhances cycling stability, albeit slightly reducing initial capacities with increasing Nb concentration. The improved cycling performance of the Nb-modified material is attributed to the effective suppression of impedance growth. Based on results from a combination of voltage fade analysis, galvanostatic intermittent titration technique, and rate performance tests, it seems that Nb modification improves the low-voltage performance of ε-$VOPO_4$ while having minimal impact on its high-voltage performance.

A cathode containing any of the materials described herein may be mixed with other electrically conductive materials and binders. Examples of electrically conductive materials include carbon black and vapor ground carbon fibers. Examples of binders include polyvinylidene fluoride (PVDF), sodium alginate, sodium carboxymethyl cellulose, polytetrafluoroethylene (PTFE), styrene butadiene rubber (SBR), and polyimide.

In an embodiment of the present invention, the conductive additive is graphene or carbon nanotubes. The amount of conductive additive may be 1-10% by weight. In one embodiment, it is about 5% by weight.

The cathode active material may be present as a sheet, ribbon, particles, or other physical form. An electrode containing the cathode active material may be supported by a current collector. A current collector may include a metal or other electrically conducting material. The current collector may be formed of carbon, carbon paper, carbon cloth or a metal or noble metal mesh or foil.

It is an object to provide an intercalation-type electrode composition for a lithium battery cathode, having a capacity of at least 260 mAh/g, and may have a capacity of at least 275 mAh/g, at least 280 mAh/g, at least 290 mAh/g, at least 300 mAh/g, or at least 305 mAh/g, for example. The intercalation electrode composition may comprise a transition metal having a two-electron redox property, having a discharge capacity of at least 75% of theoretical value, at least 80% of theoretical value, at least 85% of theoretical value, or at least 90% of theoretical value.

The lithium battery cathode may comprise a transition metal, which undergoes a change in oxidation state of at least two between a charged and discharged state.

In embodiments, the intercalation electrode composition preferably comprises $VOPO_4$, most preferably in the epsilon form, i.e., ε-$VOPO_4$. The intercalation electrode composition preferably has a conductivity enhancer comprising graphene or carbon nanotubes. The intercalation electrode composition may comprise ε-$VOPO_4$ and at least 2.5% by weight graphene, at least 3.0% by weight graphene, at least 3.5% by weight graphene, at least 4.0% by weight graphene, at least 5% by weight graphene, at least 6% by weight graphene, at least 7% by weight graphene, at least 8% by weight graphene, at least 9% by weight graphene, or at least 10% by weight graphene.

In embodiments, the intercalation electrode composition may comprise, for example, at least 75% by weight ε-$VOPO_4$, at least 5% by weight graphene nanoplatelets, and at least 5% by weight of a poly vinylidene fluoride (PVDF) binder. The intercalation electrode composition may comprise 85% by weight ε-$VOPO_4$, at least 5% by weight graphene nanoplatelets, and 10% by weight binder. The intercalation electrode composition may comprise 75% by weight ε-$VOPO_4$, 15% by weight graphene nano platelets, and 10% by weight of a poly vinylidene fluoride (PVDF) binder.

The intercalation electrode composition may be provided as a cathode in a battery comprising a lithium metal anode, an electrolyte adapted to operate at a battery potential of at least 4.5V, a separator, and a supporting lithium salt.

The intercalation electrode composition may have a first state in which at least 80 mol % of a transition metal element is oxidized in a first oxidation state, and a second state in which at least 80 mol % of a transition metal element is oxidized in a second oxidation state, the first state and the second state differing by two, and the at least 80 mol % of the transition metal element in the first state is associated with two lithium ions per transition metal element ion.

In an embodiment, a lithium battery cathode composition is provided comprising ε-$VOPO_4$, electrically conductive graphene in a ratio of at least 3% by weight of the ε-$VOPO_4$, and a binder, on a current collector substrate.

In an embodiment, an intercalation electrode composition for a lithium cathode is provided having a dual lithium ion exchange characteristic, having a capacity of about 125 mAh/g at a voltage exceeding 3.7 V, and a capacity of about 260 mAh/g at a voltage exceeding 2.0 V.

In an embodiment, an intercalation electrode composition for a lithium ion cathode is provided having a dual lithium ion exchange characteristic, having an energy capacity of at least 850 mWh/g. The energy capacity may be at least 860 mWh/g, at least 870 mWh/g, an energy capacity of at least 880 mWh/g, an energy capacity of at least 890 mWh/g, or an energy capacity of at least 900 mWh/g.

In an embodiment, an electrode composition for a lithium cathode is provided comprising ε-$VOPO_4$ having a theoretical capacity of 305 mA/g and an observed capacity of at least 275 mAh/g. The observed capacity may be at least 275 mAh/g, at least 280 mAh/g, at least 285 mAh/g, at least 290 mAh/g, at least 295 mAh/g, or at least 300 mAh/g.

In an embodiment, an electrode is provided comprising a ε-$VOPO_4$ lithium ion exchange active material, graphene nanoplatelets, and a binder, having an energy density of 900 mWh/g.

In an embodiment, an electrode is provided comprising a ε-$VOPO_4$ lithium ion exchange active material, having a current-voltage profile which displays peaks at about 2.1 V, 2.25 V, 2.5 V, and 3.9 V, representing a dual-lithium ion exchange per vanadium ion of at least 90%.

In an embodiment, the present invention provides a method of making a lithium ion battery cathode, comprising: hydrothermally or solvothermally generating ε-$VOPO_4$; mixing the ε-$VOPO_4$, with graphene nanoplatelets and a binder for form a mixture; and coating a current collector with a slurry of the mixture. The graphene nanoplatelets may a surface area of 750 $m^2/g$, for example. The binder may be polyvinylidene fluoride. The weight ratio of ε-$VOPO_4$, graphene nanoplatelets, and polyvinylidene fluoride may be 75:15:10.

The invention provides a cathode material, an electrode formed of the cathode material, and electrochemical devices, e.g., a secondary battery, formed using the electrode.

Further features and advantages of the disclosure, as well as the structure and operation of various embodiments, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

Together with the following detailed descriptions, the accompanying drawings illustrate a number of exemplary embodiments in addition to describing and demonstrating various aspects and/or principles set forth in the present disclosure. The accompanying drawings and the brief descriptions are provided to enable one of ordinary skill in the art to practice the various aspects and/or principles set forth in the present disclosure.

FIG. 18B shows ICP-OES results of pristine and Nb-modified ε-$VOPO_4$.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein as well as modifications thereof. Accordingly, various modifications and equivalents of the methods, apparatuses, and/or systems described herein will be apparent to those of ordinary skill in the art. Descriptions of well-known functions and constructions may be omitted for increased clarity and conciseness.

Figure 1A:
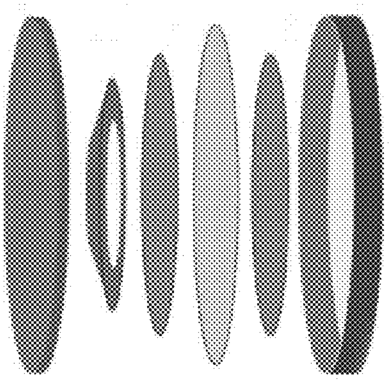
FIGS. 1A-1C illustrates various lithium batteries having an improved anode or improved cathode or both according to embodiments of the present invention.
Figure 1B:
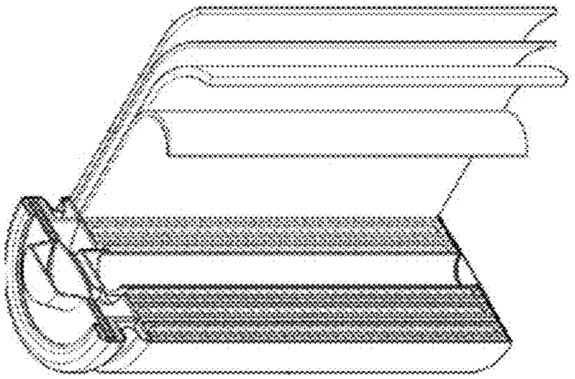
Figure 1C:
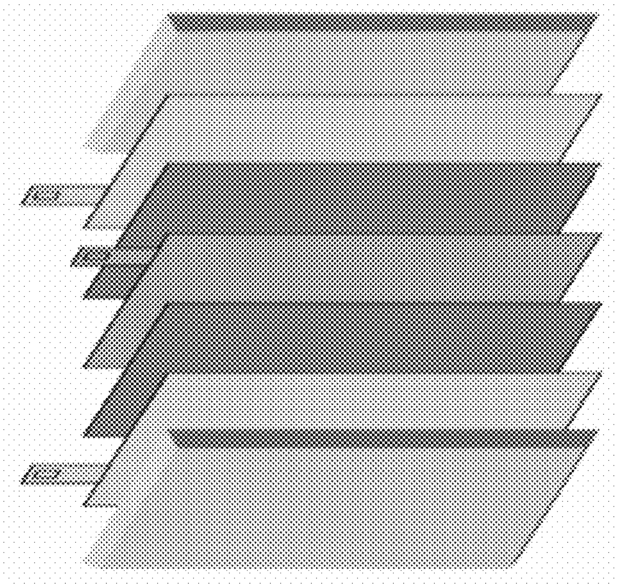

FIGS. 1A-1C illustrates various lithium batteries having an improved anode or improved cathode or both according to embodiments of the present invention.

FIG. 1A is an exploded view of a coin cell 100 according to an embodiment of the present invention having a negative case 102, a spring 104, an anode 106, a separator 108, a cathode 110, and a positive case 112. In an embodiment, the anode 106 is a lithium medal anode, as described in more detail below. In an embodiment, the cathode 110 is an ε-$VOPO_4$ cathode, as described in more detail below. In an embodiment, coin cell 100 is a primary lithium battery and appropriate power source for many small, portable electronic devices as would be known to person(s) skilled in the relevant art(s).

FIG. 1B is an exploded view of a lithium battery 120 according to an embodiment of the present invention. Lithium battery 120 is a secondary battery. As shown in FIG. 1B, lithium battery 120 has a cylindrical case 122, a cap 124, an anode 126, two separators 128*a* and 128*b*, and a cathode 130. Lithium battery 120 is manufactured by sequentially stacking the anode 126, the cathode 130, and the separators 128*a-b* as shown in FIG. 1B and rolling the stack in a spiral form. The rolled stack is than inserted into case 122 and sealed by cap 124. In embodiments, an electrolyte is included.

Lithium battery 120 is an appropriate power source for products needing more energy than can be stored in lithium coin cell 100. Such products include, but are not limited to, batteries for portable electronics like laptop computers, smartphones, cameras, portable power packs, portable power tools, et cetera.

In an embodiment, the cathode 130 is an ε-$VOPO_4$ cathode according to the present invention. The cathode 130 includes a cathode current collector, and a cathode active material layer disposed on the cathode current collector. The cathode current collector may have a thickness of about 3 μm to about 500 μm. The cathode current collector is not particularly limited, and may be formed of any material so long as it has a suitable conductivity without causing chemical changes in the fabricated battery. Examples of the cathode current collector include copper, stainless steel, aluminum, nickel, titanium, sintered carbon, copper or stainless steel that is surface-treated with carbon, nickel, titanium or silver, and aluminum-cadmium alloys. In addition, the cathode current collector may be processed to have fine irregularities on surfaces thereof so as to enhance adhesive strength of the cathode current collector to the cathode active material, and may be used in any of various forms including films, sheets, foils, nets, porous structures, foams, and non-woven fabrics. In embodiments, Cathode 130 includes a cathode active material as described in more detail below, a binder, and a conducting agent.

In embodiments, during initial cycling of lithium battery 120, a solid electrolyte interphase layer (SEI layer) forms, representing insoluble breakdown products of the electrolyte in combination with other battery components, such as electrode material. The SEI layer serves to protect the electrolyte from further free radical reactions during overvoltage periods, e.g., during charging.

In embodiments, the ε-$VOPO_4$ particles of cathode 130 are modified with niobium (Nb) as described in more detail below. The Nb-modified particles exhibit an Nb-rich layer on their surface when modified. As the Nb concentration exceeds 3.6 mol %, the unit cell parameters of the modified material deviate from those of unmodified material, indicating some partial Nb substitution by 6 mol % Nb modification. Modification significantly enhances cycling stability, albeit slightly reducing initial capacities with increasing Nb concentration. The improved cycling performance of the Nb-modified material is attributed to the effective suppression of impedance growth. Based on results from a combination of voltage fade analysis, galvanostatic intermittent titration technique, and rate performance tests, it seems that Nb modification improves the low-voltage performance of ε-$VOPO_4$ while having minimal impact on its high-voltage performance.

In embodiments, the binder strongly binds cathode active material particles together and to a current collector. Examples of the binder are, but not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (“SBR”), acrylated SBR, epoxy resin, and nylon.

In embodiments, cathode 130 may include a conducting agent used to provide conductivity. Any electron conducting material that does not induce chemical change in lithium battery 120 may be used. Examples of a conducting agent include natural graphite, artificial graphite, carbon black, acetylene black, ketjen black, carbon fibers, and metallic materials, including copper, nickel, aluminum, and silver, in powder or fiber form. The conducting agent may include a single conductive material, such as a polyphenylene derivative, or a combination of at least two conductive materials.

The amounts of the cathode active material, the binder, and the conducting agent may be equivalent to those commonly used in lithium batteries. For example, a weight ratio of the cathode active material to a mixture of the conducting agent and the binder may be from about 98:2 to about 92:8, and in some embodiments from about 95:5 to about 90:10. A mixing ratio of the conducting agent to the binder may be, but not limited, from about 1:1.5 to about 1:3.

In embodiments, cathode 130 includes a cathode current collector, and a cathode active material layer disposed on the cathode current collector. The cathode current collector may have a thickness of about 3 μm to about 500 μm. The cathode current collector is not particularly limited, and may be formed of any material so long as it has a suitable conductivity without causing chemical changes in the fabricated battery. Examples of the cathode current collector include copper, stainless steel, aluminum, nickel, titanium, sintered carbon, copper or stainless steel that is surface-treated with carbon, nickel, titanium or silver, and aluminum-cadmium alloys. In addition, the cathode current collector may be processed to have fine irregularities on surfaces thereof so as to enhance adhesive strength of the cathode current collector to the cathode active material, and may be used in any of various forms including films, sheets, foils, nets, porous structures, foams, and non-woven fabrics. The cathode active material layer includes a cathode active material, a binder, and a conducting agent.

In embodiments, anode 126 includes an anode active material, a binder, and optionally a conducting agent. The anode active material is not particularly limited, and may be selected from any anode active materials used in the art. Non-limiting examples of the anode active material are lithium metal, a lithium metal alloy, a transition metal oxide, a doped or undoped lithium material, and a material that allows reversible intercalation and deintercalation of lithium ions, which may be used as a mixture or in combination of at least two thereof. The lithium metal alloy may be an alloy of lithium with a metal selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn). Non-limiting examples of the transition metal oxide are tungsten oxide, molybdenum oxide, titanium oxide, lithium titanium oxide, vanadium oxide, and lithium vanadium oxide. Examples of the material that allows doping or undoping of lithium therein are Si, Sn, Al, Ge, Pb, Bi, Sb, and a Si—Y alloy (where Y is an alkali metal, a alkali earth metal, a Group 11 element, a Group 12 element, a Group 13 element, a Group 14 element, a Group 15 element, a Group 16 element, a transition metal, a rare earth element, and a combination thereof, except for Sn. For example, Y may be magnesium (Mg), calcium (Ca), strontium (Sr), barium (Ba), radium (Ra), scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), seaborgium (Sg), technetium (Tc), rhenium (Re), iron (Fe), lead (Pb), ruthenium (Ru), osmium (Os), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), or combinations thereof.

The material that allows reversible intercalation and deintercalation of lithium ions may be any carbonaceous anode active material that is commonly used in a lithium battery. Examples of such carbonaceous materials are crystalline carbon, amorphous carbon, or mixtures thereof. Non-limiting examples of the crystalline carbon are natural graphite, artificial graphite, expanded graphite, graphene, fullerene soot, carbon nanotubes, and carbon fiber. Non-limiting examples of the amorphous carbon are soft carbon (carbon sintered at low temperatures), hard carbon, mesophase pitch carbides, and sintered corks. The carbonaceous anode active material may be in, for example, spherical, planar, fibrous, tubular, or powder form.

The binder strongly binds anode active material particles together and to the anode current collector. Non-limiting examples of the binder are polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber ("SBR"), acrylated SBR, epoxy resin, and nylon.

The conducting agent is used to provide conductivity to the anode. Any electron conducting material that does not induce chemical change in batteries may be used. Examples of the conducting agent are carbonaceous materials, such as natural graphite, artificial graphite, carbon black, acetylene black, ketjen black, carbon fibers, and the like; metal-based materials, such as copper (Cu), nickel (Ni), aluminum (Al), silver (Ag), and the like, in powder or fiber form; and conductive materials, including conductive polymers, such as a polyphenylene derivative, and mixtures thereof.

The amounts of the anode active material, the binder, and the conducting agent may be equivalent to those commonly used in lithium batteries. For example, a weight ratio of the anode active material to a mixture of the conducting agent and the binder may be from about 98:2 to about 92:8. A mixing ratio of the conducting agent to the binder may be, but not limited to, from about 1:1.5 to about 1:3. The anode 112 and the cathode 114 may be each manufactured by mixing an active material, a conducting agent, and a binder in a solvent to prepare an active material composition, and coating the active material composition on a current collector. Any method of manufacturing such electrodes which is known to one of ordinary skill in the art may be used. Thus, a detailed description thereof will not be provided herein. Non-limiting examples of the solvent are N-methylpyrrolidone ("NMP"), acetone, and water.

As shown in FIG. 1B, a separator 128 may be disposed between the cathode and the anode. The separator helps maintain electrical isolation between the cathode and the anode. The separator may be any separator that is commonly used for lithium batteries. In particular, the separator may have low resistance to migration of ions in an electrolyte and have high electrolyte-retaining ability. Examples of the separator are glass fiber, polyester, Teflon, polyethylene, polypropylene, polyvinylidene fluoride ("PVDF"), polytetrafluoroethylene ("PTFE"), and a combination thereof, each of which may be a nonwoven fabric or a woven fabric. The separator may be a single layer or a multi-layer. Examples of the separator are a polyethylene/polypropylene double-layer separator, polyethylene/polypropylene/polyethylene triple-layer separator, and a polypropylene/polyethylene/polypropylene triple-layer separator. The separator may have a pore diameter of about 0.01 to about 10 μm and a thickness of about 3 to about 100 μm. The electrolyte may be injected between the cathode 130 and the anode 126 with the separator 128 therebetween.

A separator may include fibers, particles, web, porous sheets, or other forms of material configured to reduce the risk of physical contact and/or short circuit between the electrodes. The separator may be a unitary element, or may include a plurality of discrete spacer elements such as particles or fibers. In some examples, the electrolyte layer may include a separator infused with an electrolyte solution. In some examples such as a polymer electrolyte, the separator may be omitted.

FIG. 1C is an exploded view of a lithium battery 140 according to an embodiment of the present invention. Lithium battery 140 is a secondary battery. As shown in FIG. 1C, lithium battery 140 has a pouch encasing 142*a-b*, cathodes 144*a-b*, an anode 146, and separators 148*a-b*. In embodiments, lithium battery 140 is manufactured using a zig-zag stacking process wherein the cathodes and anodes are stacked one on top of the other with the separator in-between the stacked cathodes and anodes as would be known to person(s) skilled in the relevant art(s) given the description herein.

In an embodiment, the anode 146 is a lithium medal anode, as herein. In an embodiment, the cathode 144 is an ε-$VOPO_4$ cathode, as described herein.

Lithium battery 140 is an appropriate power source for products needing more energy than can be stored in lithium battery 120. Such products include, but are not limited to, battery systems for electric bikes, electric vehicles, and stational energy storage systems.

Figure 2A:
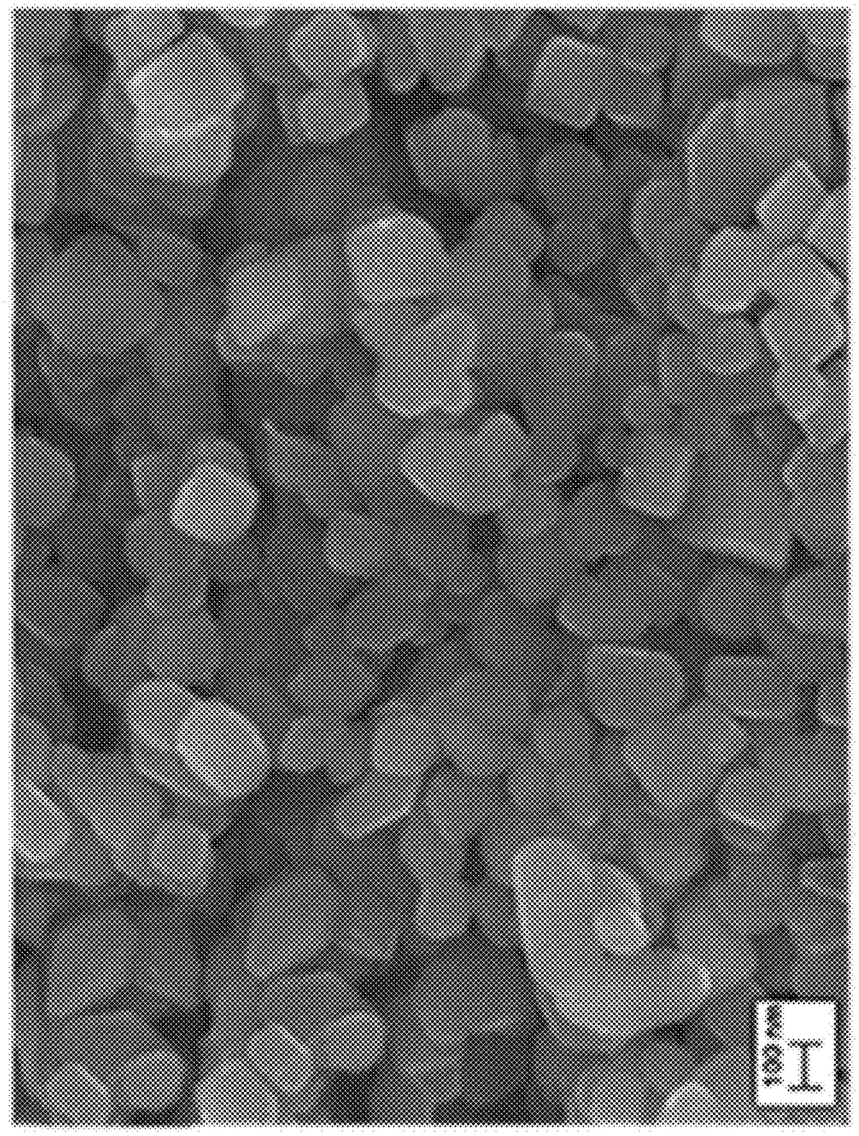
FIG. 2A is a scanning electron microscopy (SEM) image showing ε-$VOPO_4$ cathode material according to an embodiment of the present invention.

FIG. 2A is a scanning electron microscopy (SEM) image 200 showing ε-$VOPO_4$ cathode material according to an embodiment of the present invention. In an embodiment, the material is made by hydrothermal or solvothermal synthesis, which offers good control over the material's purity and crystallinity. This method can keep the overall particle size small and the size distribution narrow. As shown in FIG. 2A, the synthesized ε-$VOPO_4$ powder has nano-sized primary particles in a range of 100 to 200 nm that are cuboid in shape. Achieving small primary particles is desirable because it can improve the rate property for Li intercalation. Smaller particle size also facilitates easier lithium-ion diffusion with enhanced columbic efficiency by improving the capacity of lithium deintercalation upon discharge and decreasing the lithium intercalation potential upon charge. As seen in FIG. 2A, the nano-sized ε-$VOPO_4$ primary particles do not agglomerate nor form into secondary particles, providing a good surface area, for example, for graphene or carbon nanotube additive to wrap around and assist in electron migration during the charge/discharge process.

Figure 2B:
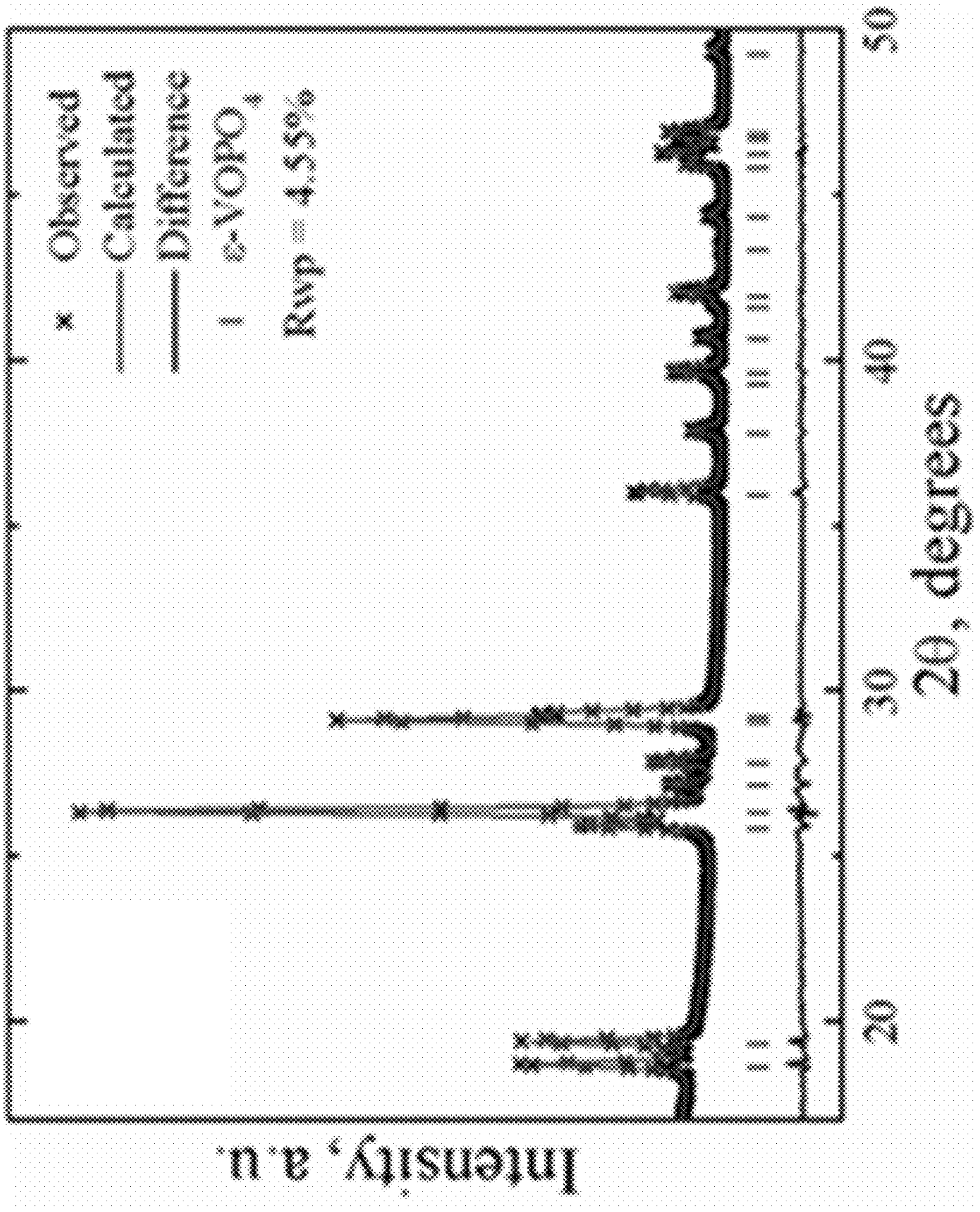
FIG. 2B shows an XRD pattern with Rietveld refinement of ε-$VOPO_4$ cathode material according to an embodiment of the present invention.

FIG. 2B shows a graph 220 of an XRD pattern with Rietveld refinement of ε-$VOPO_4$ cathode material according to an embodiment of the present invention. The lack of primary particle agglomeration, as seen in FIG. 2A, is attributed to the choice of solvent used for synthesis. By using 190 proof ethanol, ε-$VOPO_4$ results in loose particle morphology whereas 200 proof ethanol results in the formation of 21 μm balls as secondary particles. By using this solvothermal synthesis route, the precursor is successfully synthesized and calcined to produce pure crystalline ε-$VOPO_4$, as seen in FIG. 2B, resulting in sharp and narrow peaks in the x-ray diffraction pattern. The observed pattern matches well to the calculated pattern with no impurities or other vanadyl phosphate phases, resulting in a low Rwp value of 4.55%.

Figure 3A:
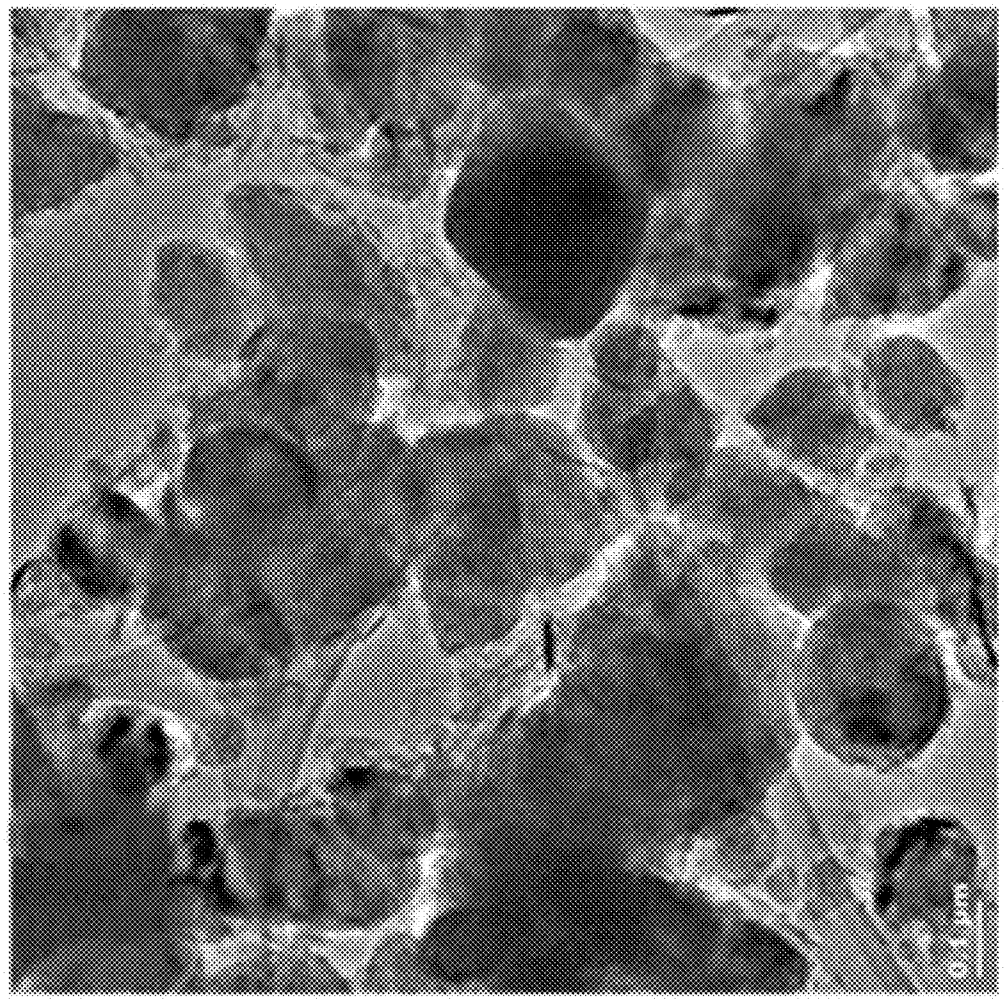
FIGS. 3A-3B show transmission electron microscopy (TEM) images of ε-$VOPO_4$ cathode material according to an embodiment of the present invention hand ground with graphene nanoplatelets for electrode preparation.
Figure 3B:
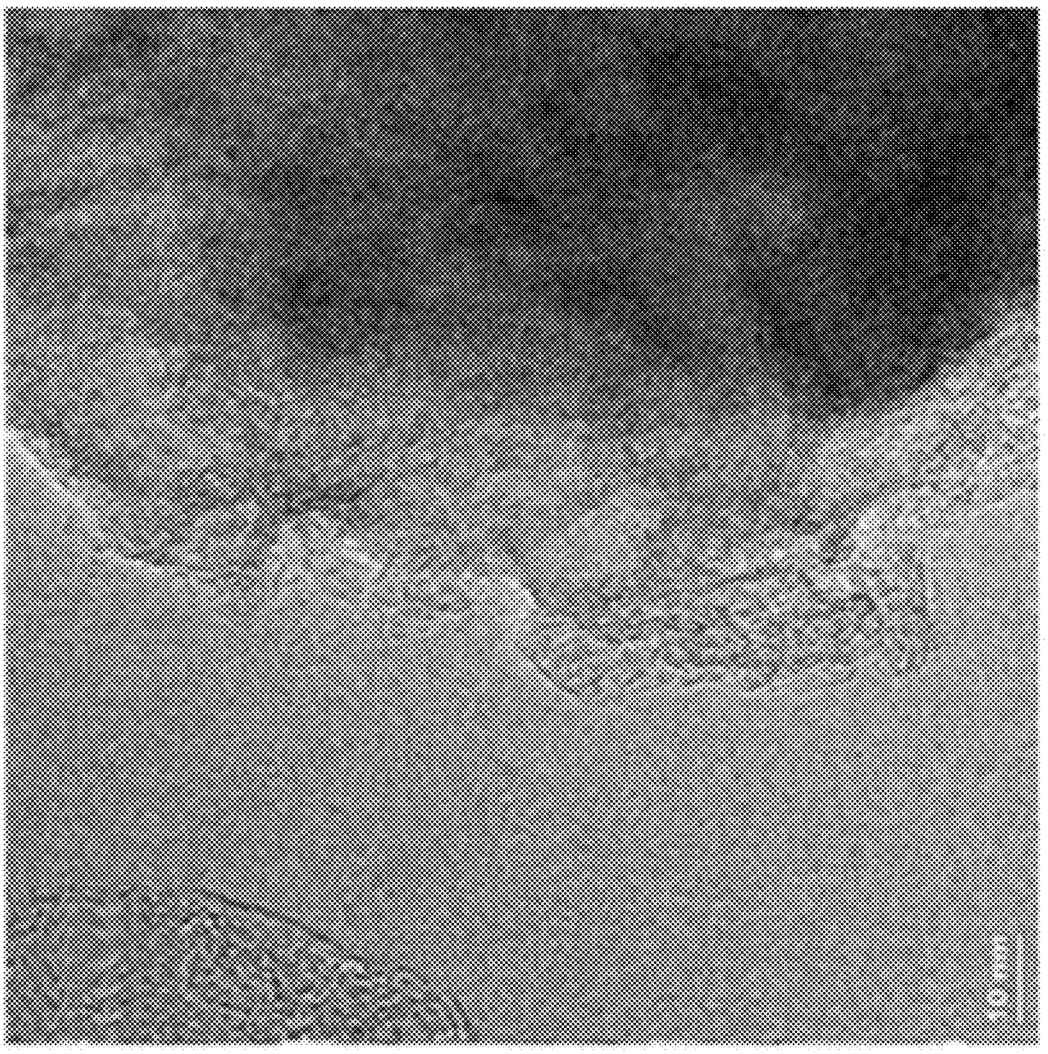

FIGS. 3A-3B show transmission electron microscopy (TEM) images 300 and 320 of ε-$VOPO_4$ cathode material according to an embodiment of the present invention hand ground with graphene nanoplatelets for electrode preparation.

Normally, ball-mill treatment is necessary to break up any agglomeration and secondary particles and to reduce the particle size for good electrochemical performance. However, since the synthesized ε-$VOPO_4$, as seen in FIG. 2A, is of nanometer size, there is no need to use this application, which helps preserve the crystal structure for better reversible intercalation chemistry. Images 300 and 320 show HRTEM images of 75 weight-percent ε-$VOPO_4$ that was hand milled with 15 weight-percent graphene nanoplatelets in a mortar and pestle before adding 10 weight-percent PDVF and NMP for electrode preparation. The images show graphene nanoplatelets forming a conductive network between every single ε-$VOPO_4$ primary particle. Upon closer inspection as seen in image 320, one can see that the graphene nanoplatelets coated on the ε-$VOPO_4$ particle are around 10 nm thick.

Figure 4A:
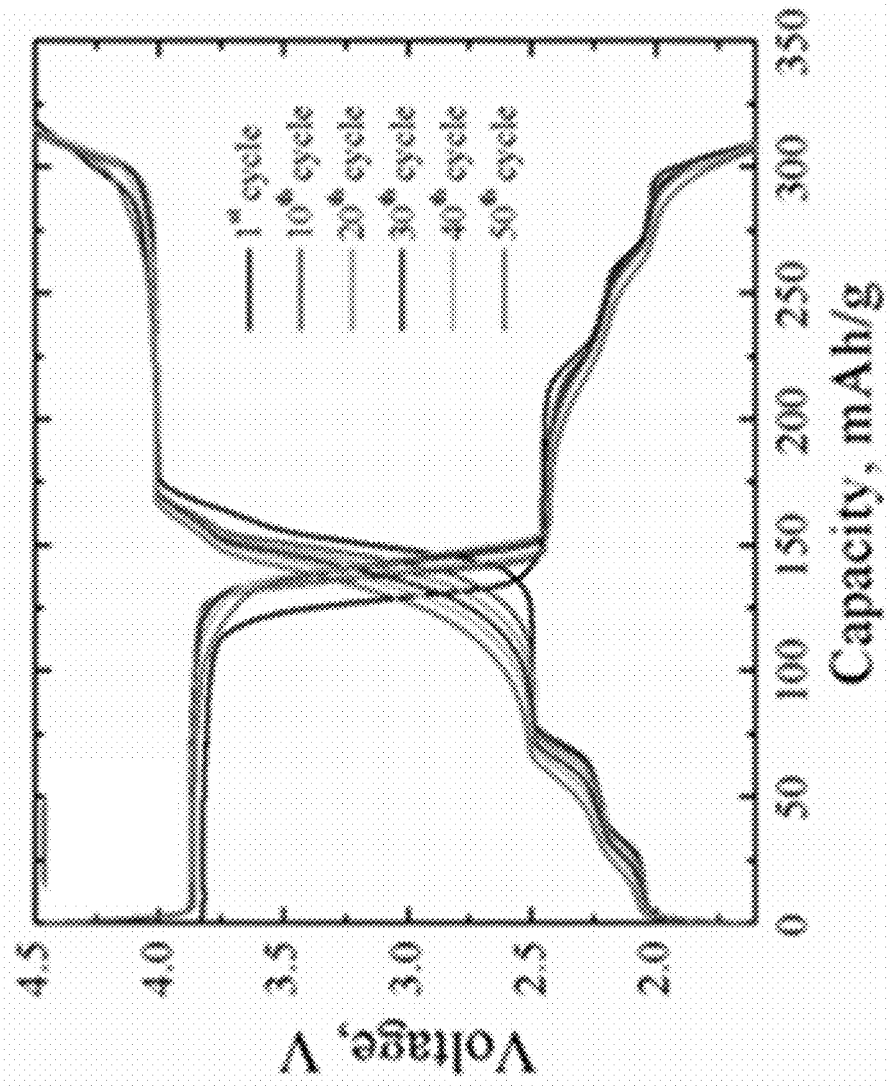
FIG. 4A shows galvanostatic charge-discharge curves of ε-$VOPO_4$ cathode material according to an embodiment of the present invention from 1.6 to 4.5 volts at C/50.
Figure 4B:
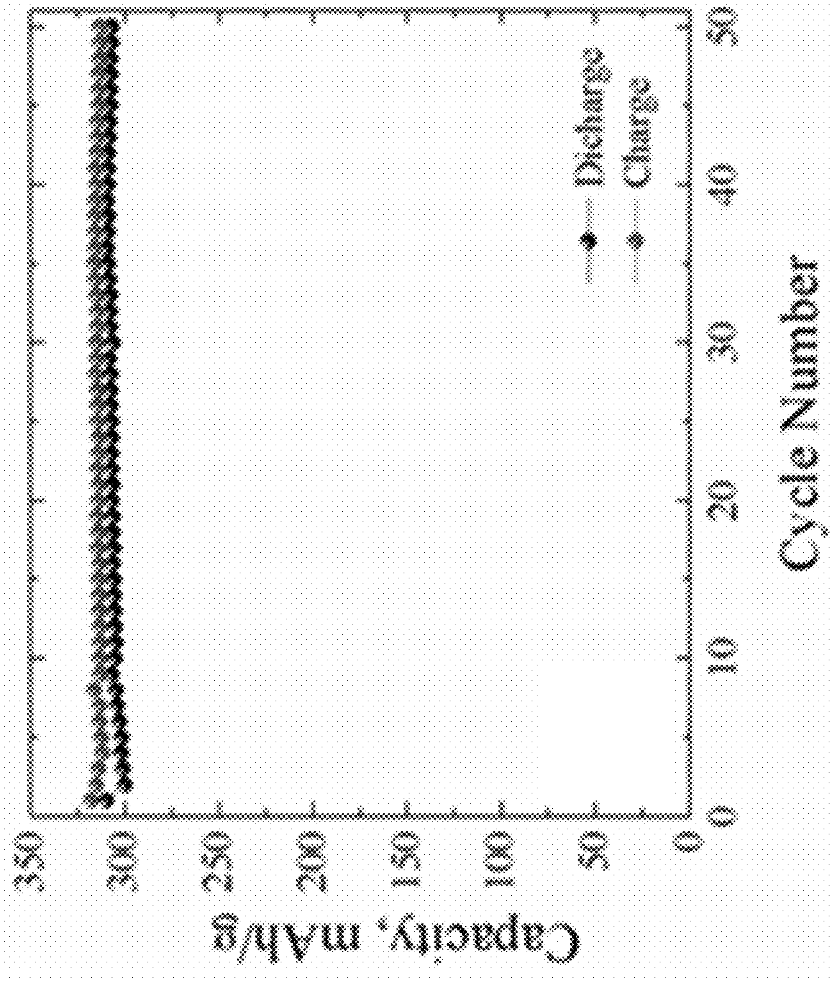
FIG. 4B shows cycle performance of ε-$VOPO_4$ cathode material according to an embodiment of the present invention from 1.6 to 4.5 volts at C/50 (C=2 Li).

FIGS. 4A and 4B show ε-$VOPO_4$ cathode material according to an embodiment of the present invention cycled in the whole voltage window from 1.6 V to 4.5 V at C/50, and capable of achieving a high discharge capacity of 305 mAh/g for at least 50 cycles.

FIG. 4A graph 400 that shows galvanostatic charge-discharge curves of ε-$VOPO_4$ cathode material according to an embodiment of the present invention from 1.6 volts to 4.5 volts at C/50. As seen in FIG. 4A, there are characteristic plateaus at ~4.0 V at the high voltage region and at ~2.5, 2.25, 2.0 V at the low voltage region. The drop from the high voltage region to the low voltage region is a step-like curve and the hysteresis gap between the charge and discharge curve is very small. The high voltage region has a long plateau which extends the capacity to ~150 mAh/g, equivalent to ~1 Li. This corresponds to the redox potential of $V^{3+}$ and $V^{4+}$ where ε-$VOPO_4$ becomes ε-$Li_2VOPO_4$. The low voltage region has three plateaus at 2.5, 2.25 and 2.0 V which also extends the capacity to ~150 mAh/g, corresponding to the second intercalation of lithium where ε-$LiVOPO_4$ becomes ε-$Li_2VOPO_4$. The plateaus at the low voltage region have maintained step-like curves even after 35 cycles, suggesting good kinetics and the changes in the local structure may be reversible for easy Li intercalation.

FIG. 4B is a graph 420 that shows cycle performance of ε-$VOPO_4$ cathode material according to an embodiment of the present invention from 1.6 volts to 4.5 volts at C/50 (C=2 Li). Cyclic voltammetry (CV) curves were measured in the voltage window of 1.6 V to 4.5 V to understand the redox process of ε-$VOPO_4$. There are four reduction peaks at certain voltages that correspond to four oxidation peaks at similar voltages. Each peak represents the reversible reaction between ε-$VOPO_4$ and ε-$Li_2VOPO_4$ that correspond to the voltage plateaus found upon galvanostatic charge and discharge cycling. Starting from the OCV point at 3.9 V, there is a single oxidation peak at 3.7 V that indicates electrochemical lithiation from ε-$VOPO_4$ to ε-$LiVOPO_4$. As the scan rate test moves to the low voltage region, there are three additional oxidation peaks. Each of the peaks signify the transition from ε-$LiVOPO_4$ to ε-$Li_2VOPO_4$ with intermediate stages in between. ε-$LiVOPO_4$ becomes ε-$Li_{1.5}VOPO_4$ at ~2.5 V, then it converts to ε-$Li_{1.75}$ $VOPO_4$ at ~2.25 V and finally becomes ε-$Li_2VOPO_4$ at ~2.0 V. Reduction peaks appear as the voltage continues to sweep from the low to high voltage domain, indicating that the $V^{5+}$ oxidation state of ε-$VOPO_4$ was recovered from $V^{3+}$ of ε-$Li_2VOPO_4$. From ε-$Li_2VOPO_4$, it becomes ε-$Li_{1.75}$ $VOPO_4$ at ~2.1 V, then ε-$Li_{1.5}$ $VOPO_4$ at 2.25 V and ε-$LiVOPO_4$ at ~2.5 V. No further reaction takes place until ~4.25 V where ε-$LiVOPO_4$ further reduces to become ε-$VOPO_4$.

Figure 5:
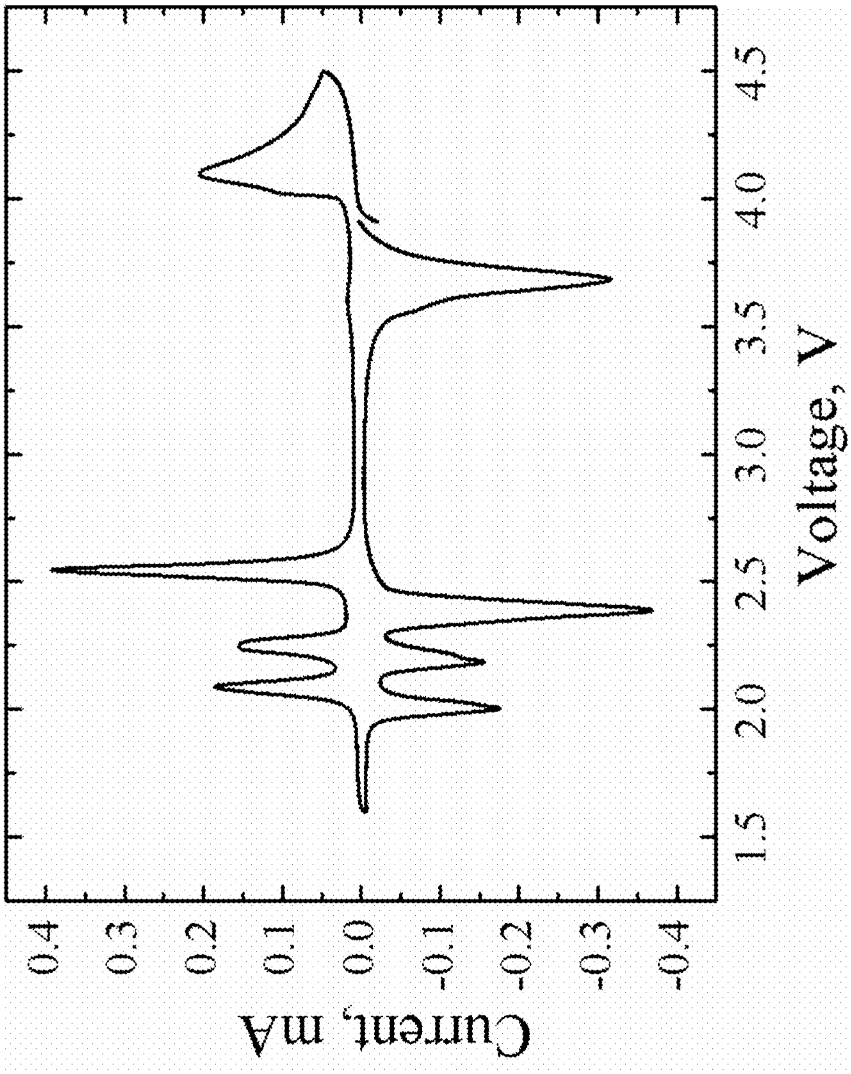
FIG. 5 shows a CV curve profile of ε-$VOPO_4$ cathode material according to an embodiment of the present invention at a scan rate of 0.02 mV/s.

FIG. 5 is a graph 500 that shows a cyclic voltammetry (CV) curve profile of ε-$VOPO_4$ cathode material according to an embodiment of the present invention at a scan rate of 0.02 mV/s. CV curves were measured in the voltage window of 1.6 volts to 4.5 volts to determine the redox process of ε-$VOPO_4$. There are four reduction peaks at certain voltages that correspond to four oxidation peaks at similar voltages. Each peak represents the reversible reaction between ε-$VOPO_4$ and ε-$Li_2VOPO_4$ that correspond to the voltage plateaus found upon galvanostatic charge and discharge cycling. Starting from the OCV point at 3.9 V, there is a single oxidation peak at 3.7 V that indicates electrochemical lithiation from ε-$VOPO_4$ to ε-$LiVOPO_4$. As the scan rate test moves to the low voltage region, there are three additional oxidation peaks. Each of the peaks signify the transition from ε-$LiVOPO_4$ to ε-$Li_2VOPO_4$ with intermediate stages in between. ε-$LiVOPO_4$ becomes ε-$Li_{1.5}$ $VOPO_4$ at ~2.5 V, then it converts to ε-$Li_{1.75}VOPO_4$ at ~2.25 V and finally becomes ε-$Li_2VOPO_4$ at ~2.0 V. Reduction peaks appear as the voltage continues to sweep from the low to high voltage domain, indicating that the $V^{5+}$ oxidation state of ε-$VOPO_4$ was recovered from $V^{3+}$ of ε-$Li_2VOPO_4$. From ε-$Li_2VOPO_4$, it becomes ε-$Li_{1.75}$ $VOPO_4$ at ~2.1 V, then ε-$Li_{1.5}$ $VOPO_4$ at ~2.25 V and ε-$LiVOPO_4$ at ~2.5 V. No further reaction takes place until ~4.25 V where ε-$LiVOPO_4$ further reduces to become ε-$VOPO_4$.

Figure 6A:
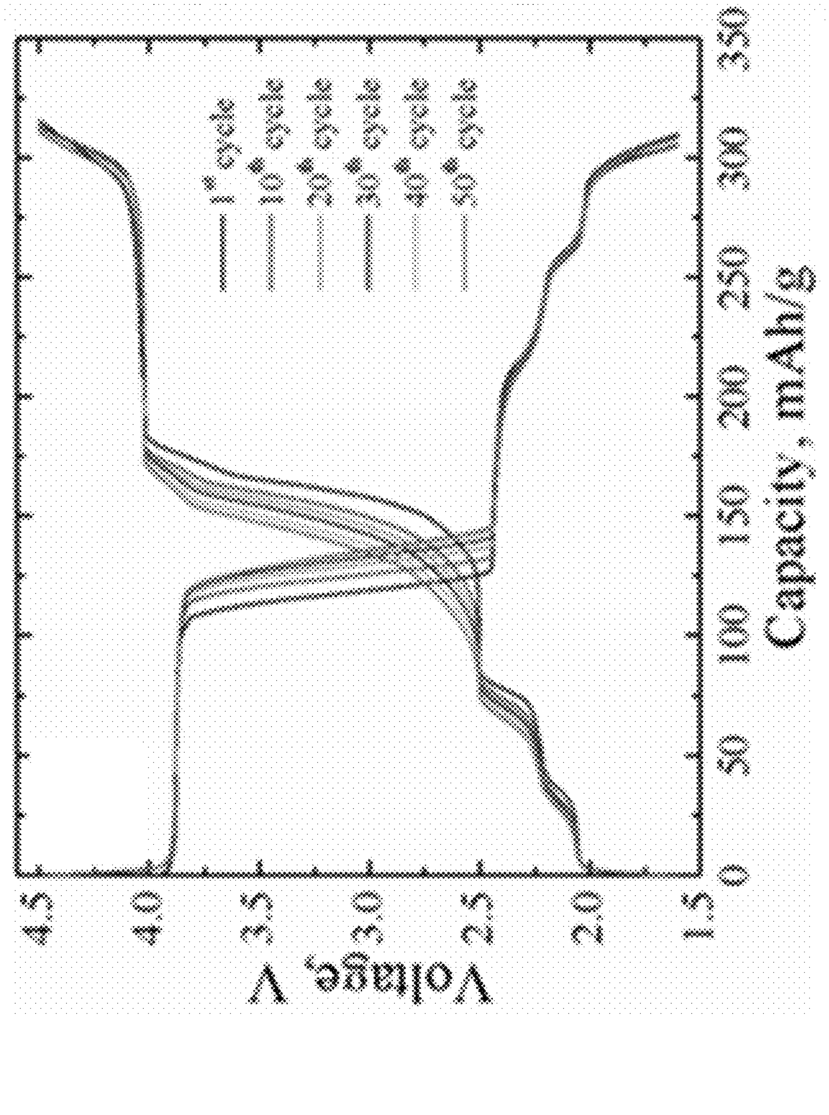
FIG. 6A shows galvanostatic charge-discharge curves of ε-$VOPO_4$ cathode material according to an embodiment of the present invention from 1.6 to 4.5 volts at C/20.
Figure 6B:
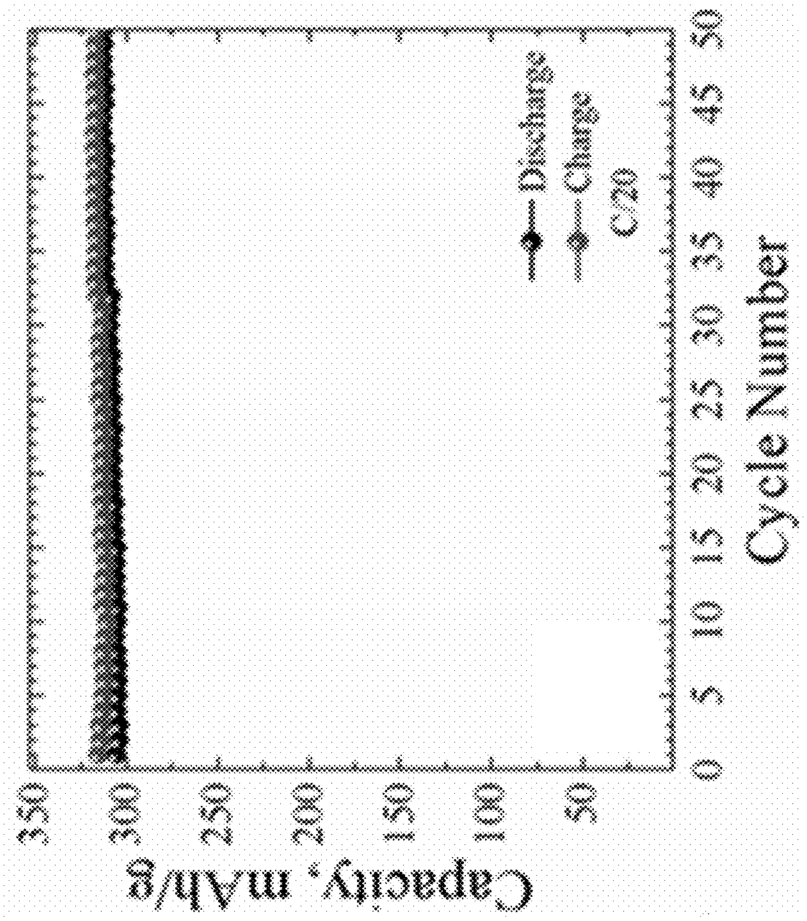
FIG. 6B shows cycle performance of ε-$VOPO_4$ cathode material according to an embodiment of the present invention from 1.6 to 4.5 volts at C/20 (C=2 Li).

FIG. 6A is a graph 600 showing galvanostatic charge-discharge curves of ε-$VOPO_4$ cathode material according to an embodiment of the present invention from 1.6 to 4.5 volts at C/20. FIG. 6B is a graph 620 showing cycle performance of ε-$VOPO_4$ cathode material according to an embodiment of the present invention from 1.6 to 4.5 volts at C/20 (C=2 Li). As shown in the graphs in FIGS. 6A and 6B, even at a faster rate ε-$VOPO_4$ can still deliver a discharge capacity of ~305 mAh/g for up to 40 cycles at C/20. The long high voltage plateau extending past 100 mAh/g is preserved and each of the characteristic steps in the low voltage region are clearly sustained with no signs of diminishing for up to 30 cycles. The drop from the high voltage region to the low voltage region evolved to a slope-like curve, which helps make up for the shorter high voltage plateau in the beginning. In subsequent cycles, the high voltage plateau slightly increases. The capacity of the 1st high voltage discharge plateau was ~125 mAh/g and by the 35th cycle, it increased to ~150 mAh/g which is equivalent to 1 Li. The low voltage region seems to show the opposite trend. As the high voltage plateau starts to increase in capacity, the low voltage steps start to decrease as well to maintain the overall discharge capacity at ~305 mAh/g.

Figure 7A:
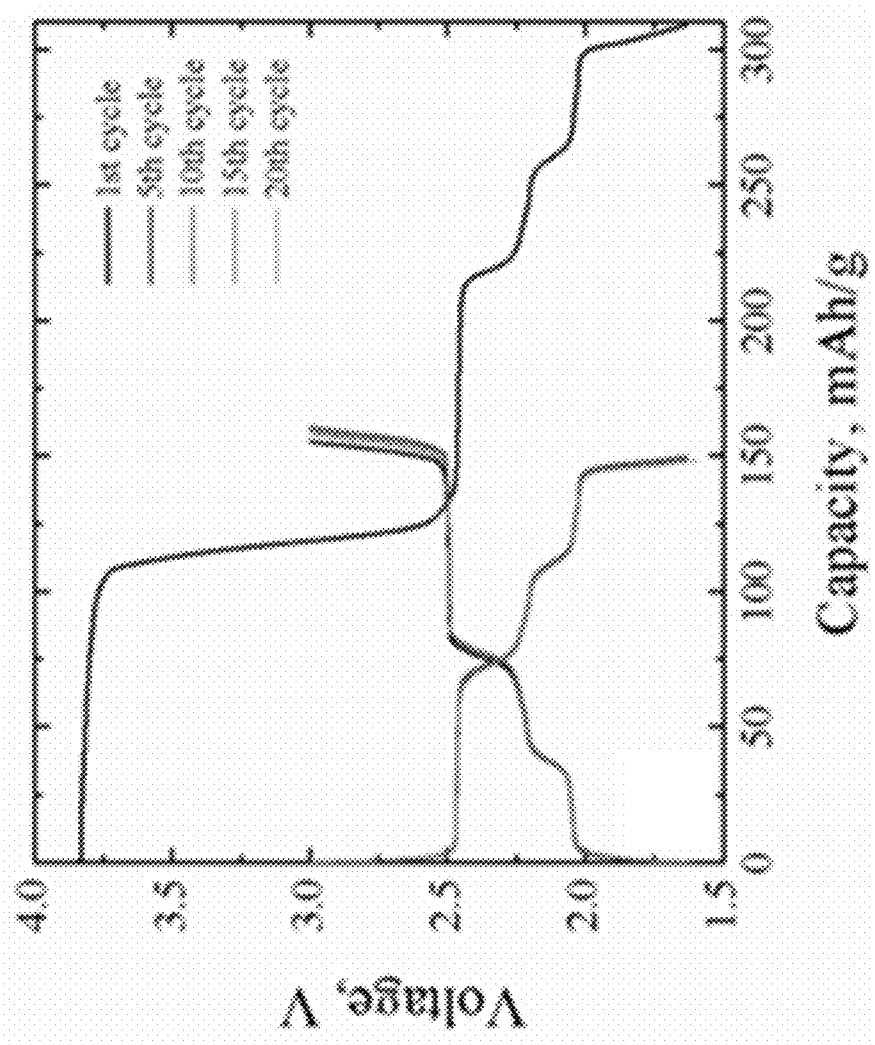
FIG. 7A shows galvanostatic charge-discharge curves of ε-$VOPO_4$ cathode material according to an embodiment of the present invention at the low voltage region, from 1.6 to 3.0 volts.
Figure 7B:
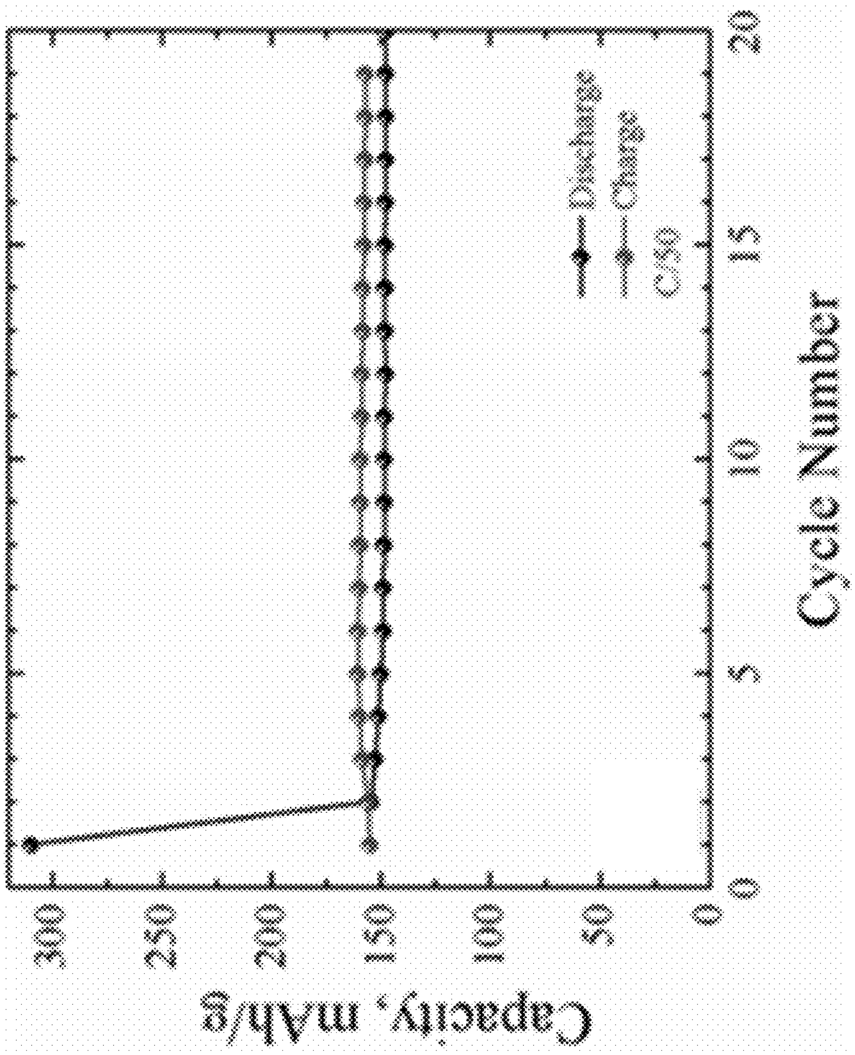
FIG. 7B shows cycle performance in the low voltage region, 1.6 to 3.0 volts, of ε-$VOPO_4$ cathode material according to an embodiment of the present invention at C/50 (C=2 Li).

FIG. 7A is a graph 700 showing galvanostatic charge-discharge curves of ε-$VOPO_4$ cathode material according to an embodiment of the present invention at the low voltage region, from 1.6 to 3.0 volts. FIG. 7B is a graph 720 showing cycle performance in the low voltage region, 1.6 to 3.0 volts, of ε-$VOPO_4$ cathode material according to an embodiment of the present invention at C/50 (C=2 Li). In these figures, cycling of ε-$VOPO_4$ has been separated at the high voltage region and the low voltage region to show the stability of the electrochemical curve and capacity without the influence of each other. As seen in the graphs of FIGS. 7A and 7B, ε-$VOPO_4$ cycled in the low voltage region has three distinct plateaus at 2.5 V, 2.25 V and 2.0 V, which is in agreement with DFT calculations confirming the two intermediate phases at x equals 1.5 and 1.75 in the low-voltage regime. The initial discharge curve in FIG. 7A is different because the cell was discharged from OCV first, delivering more than 300 mAh/g. Even after 30 cycles, the graph in FIG. 7A shows that each voltage step is clearly distinguished, delivering a reversible capacity of ~160 mAh/g, correlating to 1 Li. From then on, the cell was continuously charged and discharged in the low voltage window, from 1.6 V to 3.0 V.

The graph in FIG. 7B shows that the low voltage steps maintained ~160 mAh/g for up to 30 cycles with no sign of decay at all, suggesting good kinetics at the low voltage region. The charge-discharge profiles with steps agree with many reports, giving evidence to the existence of intermediate phases of ε-$Li_xVOPO_4$ where x equals 1.5 and 1.75.

Figure 8A:
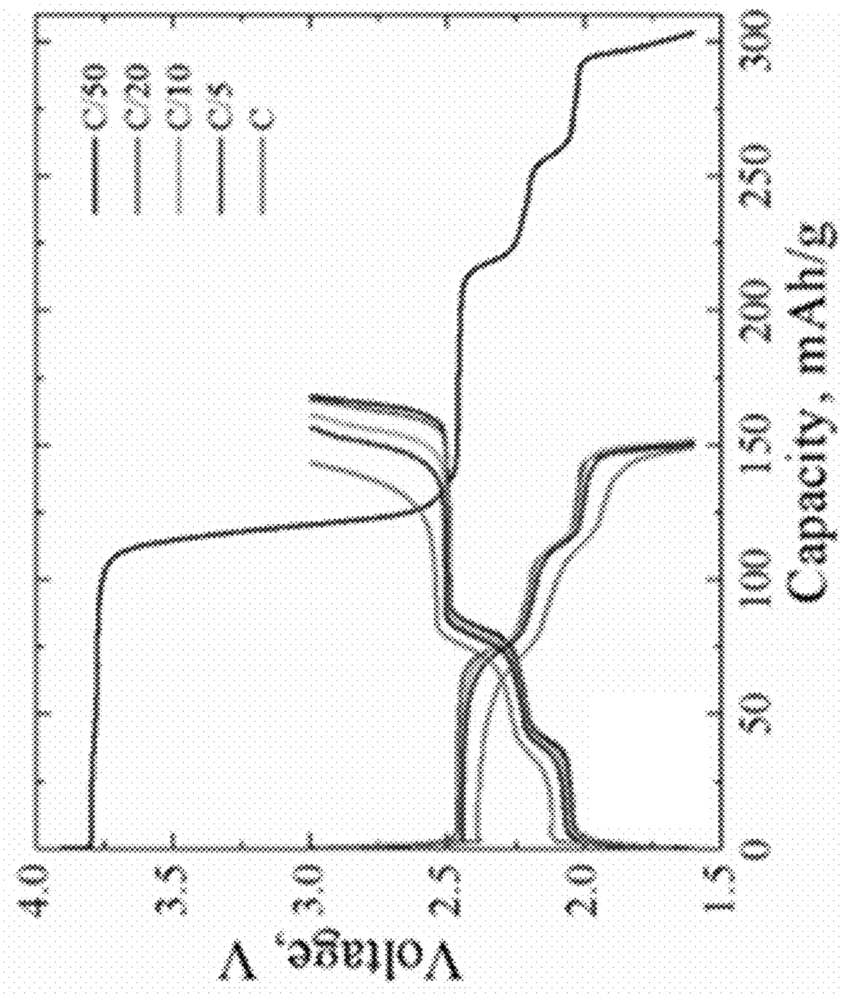
FIG. 8A shows cycling curves of ε-$VOPO_4$ cathode material according to an embodiment of the present invention in the low voltage region, from 1.6-3.0 volts, at different rates.
Figure 8B:
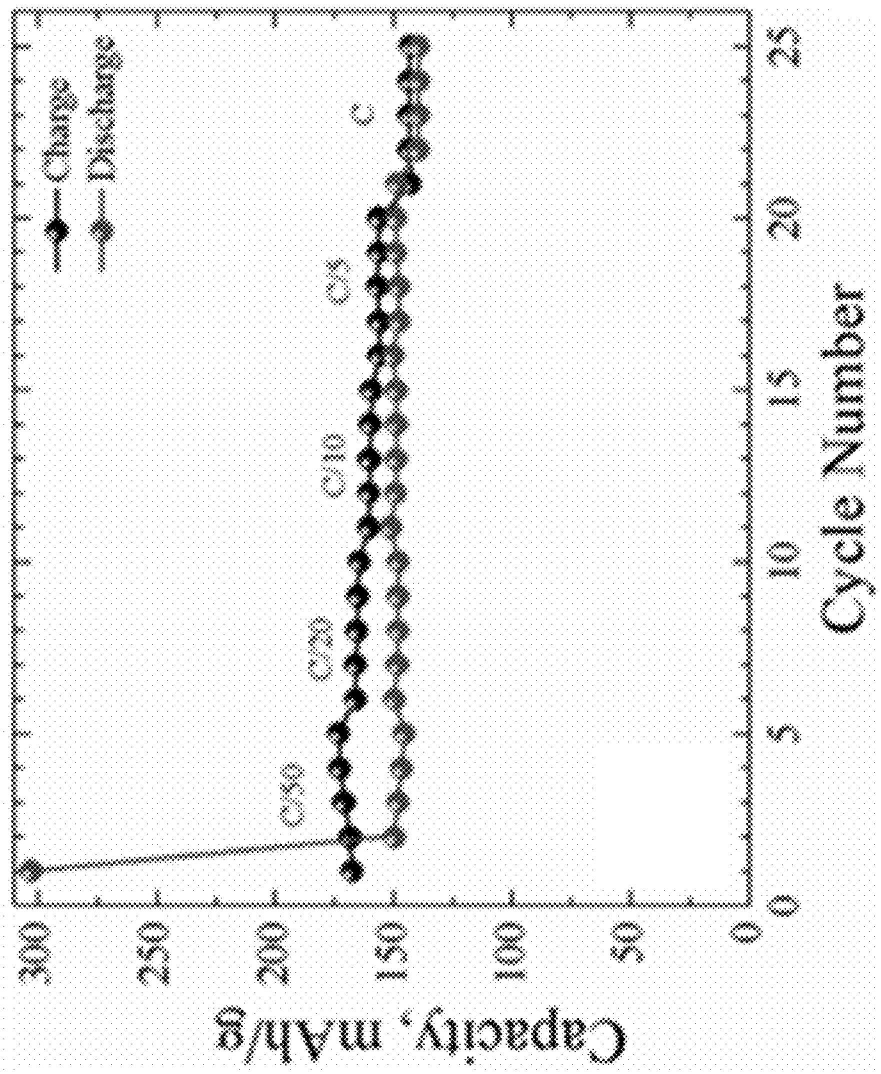
FIG. 8B shows rate test capacities of ε-$VOPO_4$ cathode material according to an embodiment of the present invention in the low voltage region, from 1.6 to 3.0 volts.

FIG. 8A is a graph 800 showing cycling curves of ε-$VOPO_4$ cathode material according to an embodiment of the present invention in the low voltage region, from 1.6-3.0 volts, at different rates. FIG. 8B is a graph showing rate test capacities of ε-$VOPO_4$ cathode material according to an embodiment of the present invention in the low voltage region, from 1.6 to 3.0 volts. As shown in the figures, a rate test in the low voltage region was performed to show how faster cycling can affect the plateaus at 2.5 V, 2.25 V and 2.0 V. To start the rate test at the low voltage region, the cell was first discharged from OCV to 1.6 V at C/50, delivering a discharge capacity of over 300 mAh/g. From C/50 to C/5, the low voltage plateaus still maintained a discharge capacity of ~150 mAh/g with clearly defined step-like features, as shown in FIG. 8A. When the rate increased to 1 C, the discharge capacity is still ~150 mAh/g but the plateaus are more slope-in shape at slightly lower voltages. As the cycling rate increases, the difference between the charge and discharge capacities decreases, as shown in FIG. 8B. From C/50, the charge capacity is 175 mAh/g while the discharge is ~150 mAh/g. When the rate increased to 1 C, the charge and discharge capacities are ~150 mAh/g, thereby increasing the coulombic efficiency to ~100%. When cycled at the low voltage range, ε-$VOPO_4$ can reversibly intercalate one full lithium ion at the low voltage region, even at faster cycling rates.

Figure 9A:
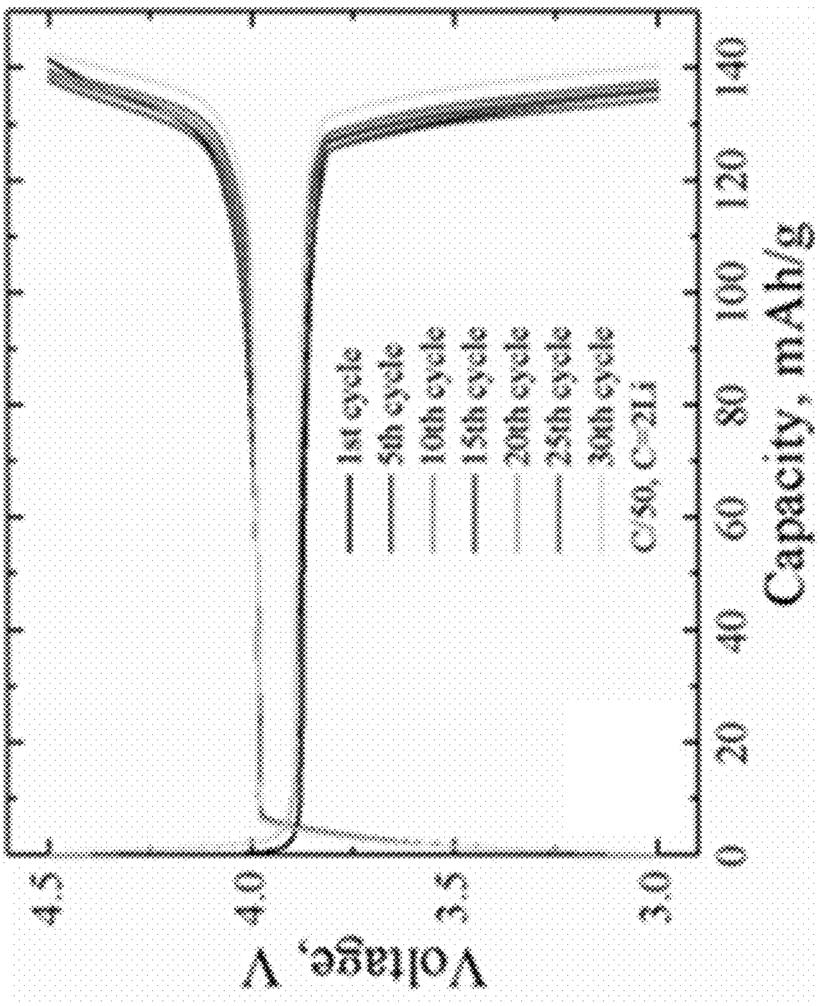
FIG. 9A shows galvanostatic charge-discharge curves of ε-$VOPO_4$ cathode material according to an embodiment of the present invention at the high voltage region, from 3.0 to 4.5 volts.
Figure 9B:
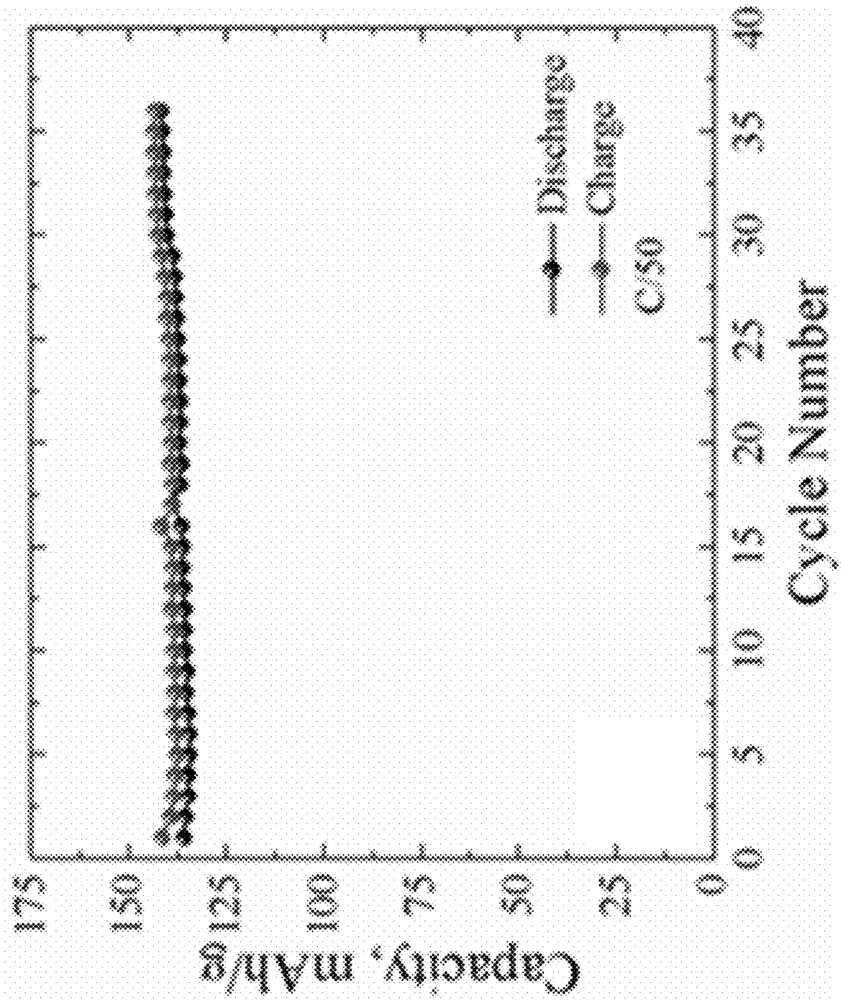
FIG. 9B shows cycle performance in the high voltage region, 3.0-4.5 volts, of ε-$VOPO_4$ cathode material according to an embodiment of the present invention at C/50 (C=2 Li).

FIG. 9A shows galvanostatic charge-discharge curves of ε-$VOPO_4$ cathode material according to an embodiment of the present invention at the high voltage region, from 3.0 to 4.5 volts. FIG. 9B shows cycle performance in the high voltage region, 3.0-4.5 volts, of ε-$VOPO_4$ cathode material according to an embodiment of the present invention at C/50 (C=2 Li). The graphs of these figures show how long-term cycling affects the shape and capacity of ε-$VOPO_4$ cycled in the high voltage region, from 3.0 V to 4.5 V. In this high voltage window, there is a plateau at ~4.0 V that coincides with the $V^{3+}/V^{4+}$ redox where ε-$VOPO_4$↔$LiVOPO_4$. This high voltage plateau delivers a reversible capacity of ~140 mAh/g for up to 35 cycles which is close to 0.93 Li. This exceeds previously reported results, where only 0.83 Li was inserted into ε-$VOPO_4$ and 0.65 Li was inserted into ε-$LiVOPO_4$. After 30 cycles, the capacity slowly climbs to 150 mAh/g which corresponds to 1 Li which agrees with the trend in the galvanostatic charge-discharge curves in FIG. 5. Even after 30 cycles, FIG. 9B shows that ε-$VOPO_4$ delivers a reversible capacity of ~150 mAh/g, correlating to 1 Li. This plateau is step-like with no signs of fading after many cycles, suggesting easy reversible intercalation.

Figure 10A:
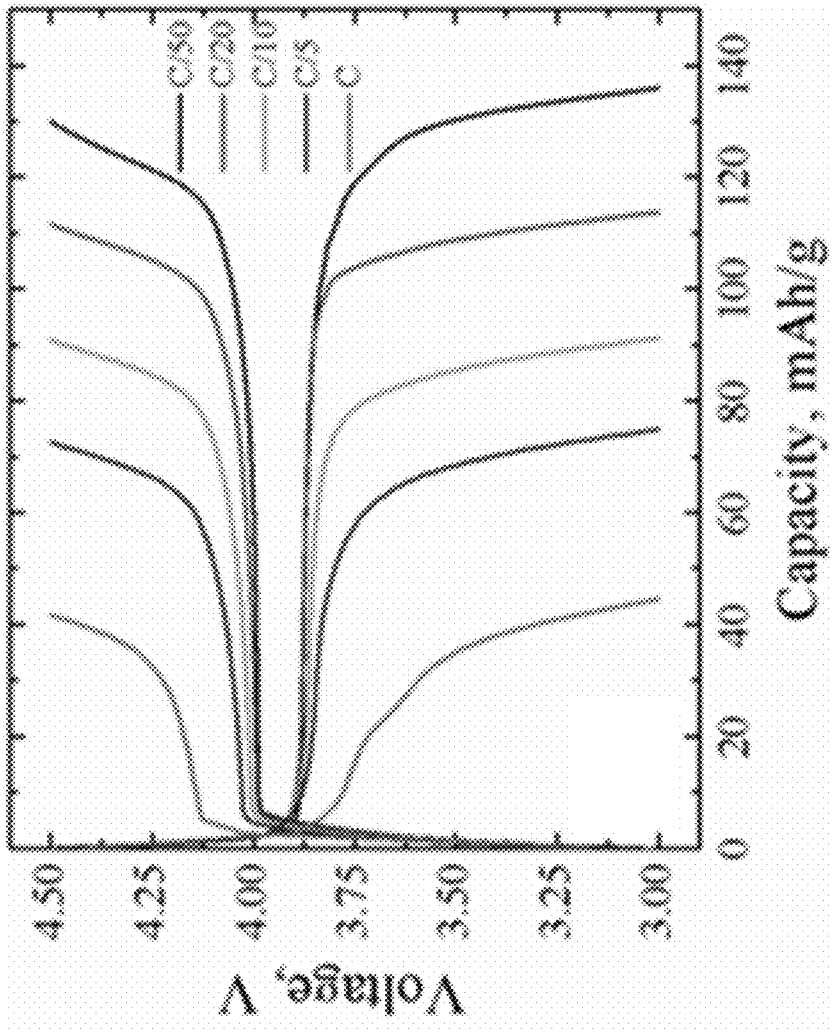
FIG. 10A shows Cycle curves of ε-$VOPO_4$ cathode material according to an embodiment of the present invention at high voltage region, from 3.0 to 4.5 volts, at different current rates.
Figure 10B:
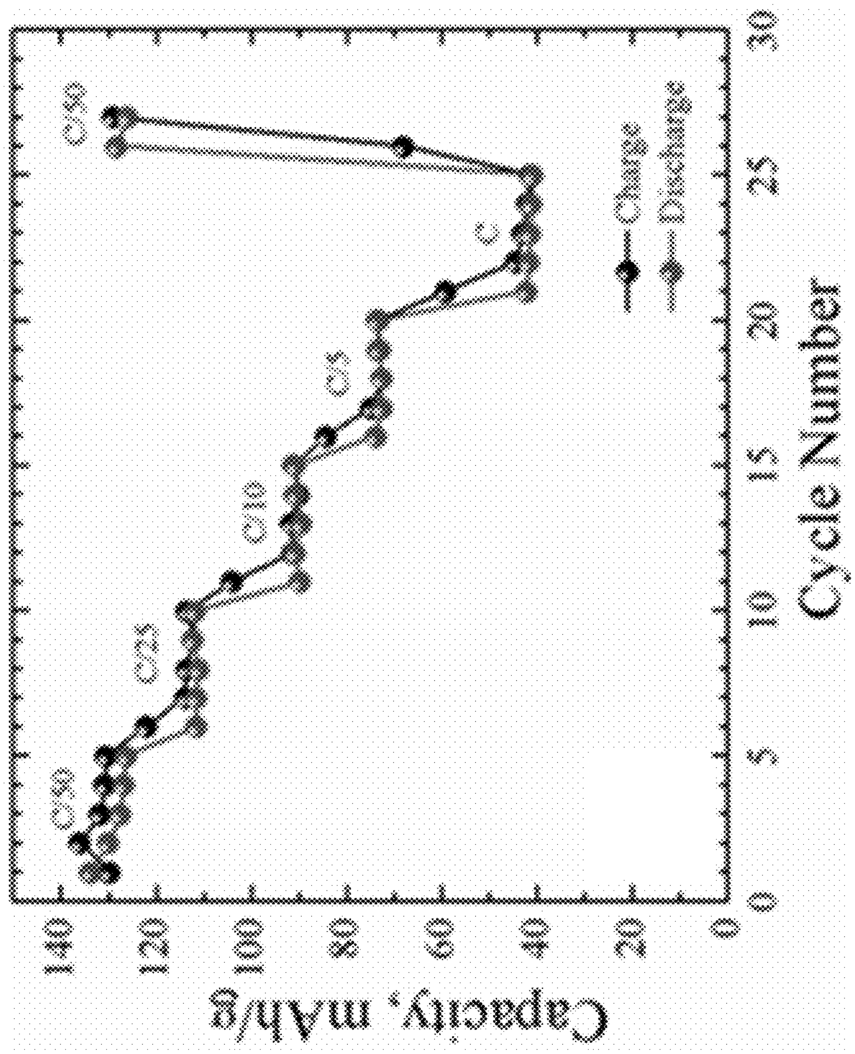
FIG. 10B shows rate test capacities of ε-$VOPO_4$ cathode material according to an embodiment of the present invention in the low voltage region, from 3.0 to 4.5 volts.

FIG. 10A is a graph 1000 showing cycle curves of ε-$VOPO_4$ cathode material according to an embodiment of the present invention at high voltage region, from 3.0 to 4.5 volts, at different current rates. FIG. 10B is a graph 1020 showing rate test capacities of ε-$VOPO_4$ cathode material according to an embodiment of the present invention in the low voltage region, from 3.0 to 4.5 volts. These graphs show how different rates can affect the high voltage plateau of ε-$VOPO_4$ at ~4.0 V. At C/50, the discharge capacity is around 130 mAh/g and the capacity decreases as the rate gets faster. By 1 C, the discharge capacity dropped to around 40 mAh/g. Despite the fast rate cycling of 1 C, the cell could deliver the high discharge capacity of 140 mAh/g after it was cycled back to C/50. This suggests that the structure was preserved, even at fast cycling, and can maintain a high discharge capacity when it was cycled back to C/50 from 1 C. It also indicates that faster cycling leads to higher coulombic efficiency. It is evident that from C/50 to C, the coulombic efficiency increases. From C/25, some of the charge and discharge capacities are overlapping and by C/10, C/5 and C, the discharge capacities are practically the same as the charge. This means that at faster rates, it can de/intercalate lithium ions more efficiently.

In embodiments, the cathode ε-$VOPO_4$ particles are modified with niobium (Nb). The Nb-modified particles exhibit an Nb-rich layer on their surface when modified. As the Nb concentration exceeds 3.6 mol %, the unit cell parameters of the modified material deviate from those of unmodified material, indicating some partial Nb substitution by 6 mol % Nb modification. Modification significantly enhances cycling stability, albeit slightly reducing initial capacities with increasing Nb concentration. The improved cycling performance of the Nb-modified material is attributed to the effective suppression of impedance growth. Through a combination of voltage fade analysis, galvanostatic intermittent titration technique, and rate performance tests, it has been confirmed that Nb modification improves the low-voltage performance of ε-$VOPO_4$ while having minimal impact on its high-voltage performance.

In an embodiment, the Nb-modified ε-$VOPO_4$ was synthesized and prepared as follows. The ε-$VOPO_4$ powders were first synthesized by calcinating monoclinic $H_2VOPO_4$. 1.754 g of $VCl_3$ (Sigma-Aldrich, 97%) and 0.884 g of $P_2O_5$(Sigma-Aldrich, ≥98%) were dissolved in 190-proof ethanol. The solution was placed in a 4748 Type 125 mL PTFE-lined reactor (Parr Instrument Co.), and the reaction was set to 180° C. for 72 hours to form monoclinic $H_2VOPO_4$. The powder was then filtered, washed with distilled water, ethanol, and acetone, and dried at 65° C. The light greenish-brown $H_2VOPO_4$ powder was heated at 550° C. in flowing oxygen for 3 hours at 5° C./min to form bright yellow ε-$VOPO_4$ powders. Nb-modified ε-$VOPO_4$ powders were prepared following published methods. (Xin, F.; Zhou, H.; Chen, X.; Zuba, M.; Chernova, N.; Zhou, G.; Whittingham, M. S. Li—Nb—O Coating/Substitution Enhances the Electrochemical Performance of the LiNi 0.8 Mn 0.1 Co 0.1 O 2 (NMC 811) Cathode. ACS Appl. Mater. Interfaces 2019, 11 (38), 34889-34894. doi.org/10.1021/acsami.9b09696.) The active material powders and niobium ethoxide (1.2, 3.6, 6 mol %) (Sigma Aldrich, 99.95%) were combined in 1 mL of 200-proof ethanol, sonicated for 20 minutes, and stirred for 1 hour in an oil bath at 30° C. The solution was heated overnight at 80° C. to ensure complete evaporation of the ethanol. The recovered powders were sintered at 500° C. in flowing O2 for 3 hours at 5° C./min.

Powder X-ray diffraction (XRD) patterns were collected using a Bruker D8 Advance diffractometer with filtered Cu Kα radiation over the 2θ range of 10° to 80°. High-resolution powder diffraction (HRXRD) data were collected at the Advanced Photon Source (APS), Argonne National Laboratory, beamline 17-BM, from 2θ range of 1° to 120°, λ=0.458 Å. The powder sample was loaded into capillaries with a packing density of ~1.3 g/cc. ICDD-PDF numbers 04-014-1224 and 04-009-6369 were used as a reference for ε-$VOPO_4$ and β-$VOPO_4$, respectively. Phase identification and Rietveld refinements were conducted using the PDF-2016 and TOPAS software packages, respectively. A scanning electron microscopy (SEM) was used to study the morphology and particle size. These samples were first carbon-coated using the Ted Palla 208C High Vacuum Turbo Carbon Coater, and the micrographs were collected by the Zeiss Supra-55 VP field emission SEM. Transmission electron microscopy (TEM) was done using the Thermo-Fischer Talos F200X at an accelerating voltage of 200 kV. The active particles were hand dispersed with wooden toothpicks before adhering to a copper grid with lacey carbon for electrostatic adsorption. X-ray Photoemission Spectroscopy (XPS) was conducted using a Phi VersaProbe 5000 system with a monochromated A1 Kα source and a hemispherical analyzer. All samples were mixed with graphite to be used as a reference.

Electrodes were prepared by mixing the ε-$VOPO_4$ active material and graphene nanoplatelets (surface area 750 m2/g, XG Sciences) for 20 minutes in a planetary mixer with ceramic balls. A 10% polyvinylidene fluoride (PVDF, Aldrich) binder in 1-methyl-2-pyrrolidinone (NMP, Aldrich) solution along with 0.5 mL NMP solvent was added to the slurry and mixed for another 20 minutes. The ratio of active material to carbon additive to PVDF is 75:15:10. The slurry was laminated onto an Al foil current collector and vacuum-dried at 65° C. overnight. Electrodes were assembled in an Ar-filled glovebox using 2032-type coin cells (Hohsen CR2032, Japan) with a pure lithium chip (thickness 600 μm, China Energy Lithium Co.) as the anode/reference electrode, 30 μL of commercial LP 30 electrolyte (1 M $LiPF_6$ in EC:DMC (1:1)), and a polyethylene separator. All electrochemical tests were conducted using a LANDdt V7 or a VMP (Bio-Logic) multichannel potentiostat.

Galvanostatic charge-discharge tests were tested using a current density of C/10 (C=2 Li or 305 mAh/g) within 1.6 V-4.5 V. Electrochemical impedance spectroscopy (EIS) experiments over the frequency range of 100 kHz to 1 MHz were conducted. Rate tests were conducted from C/10 to 2 C for 5 cycles each within the low-(1.6 V-3.0 V) and high-(3.0 V-4.5 V) voltage regions. Galvanostatic intermittent titration technique (GITT) measurements were conducted within the voltage window of 1.6 V-4.5 V by applying current at C/10 for 1 hour, followed by 24 hours of relaxation.

Figure 11:
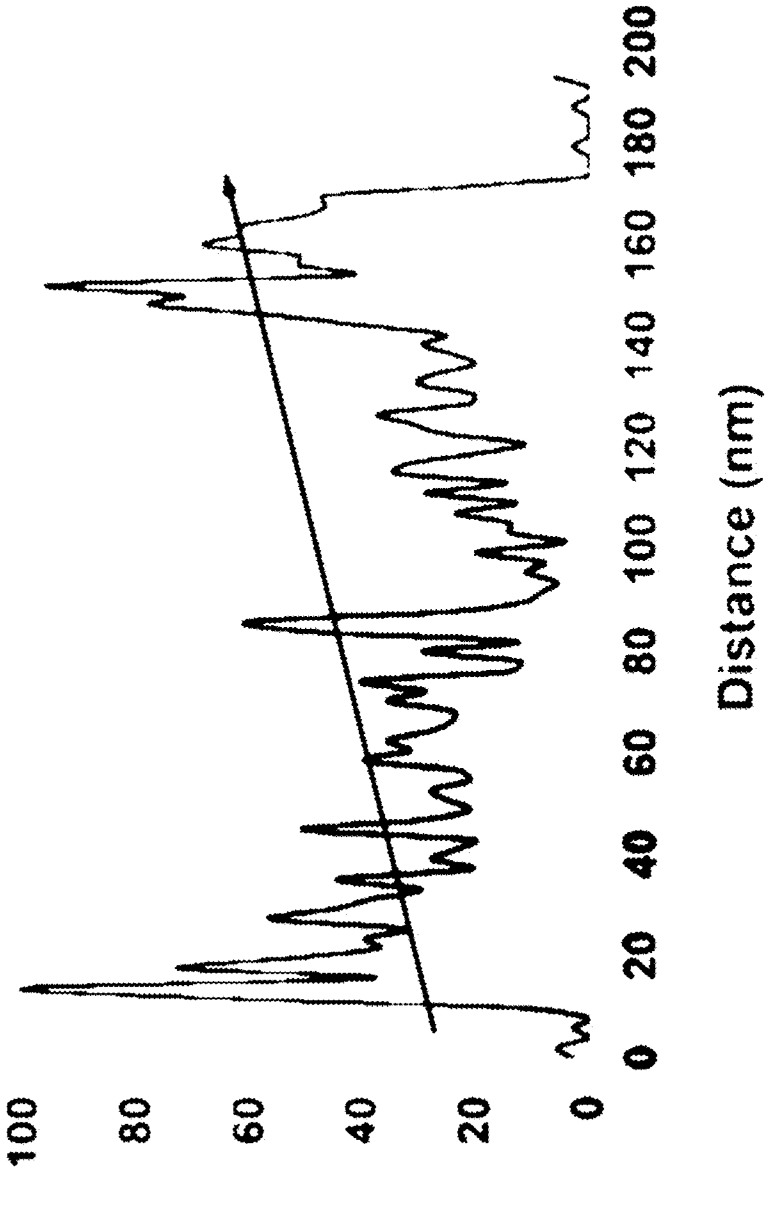
FIG. 11 shows an EDS line scan through a single 6 mol % Nb-modified ε-$VOPO_4$ particle.
Figure 12:
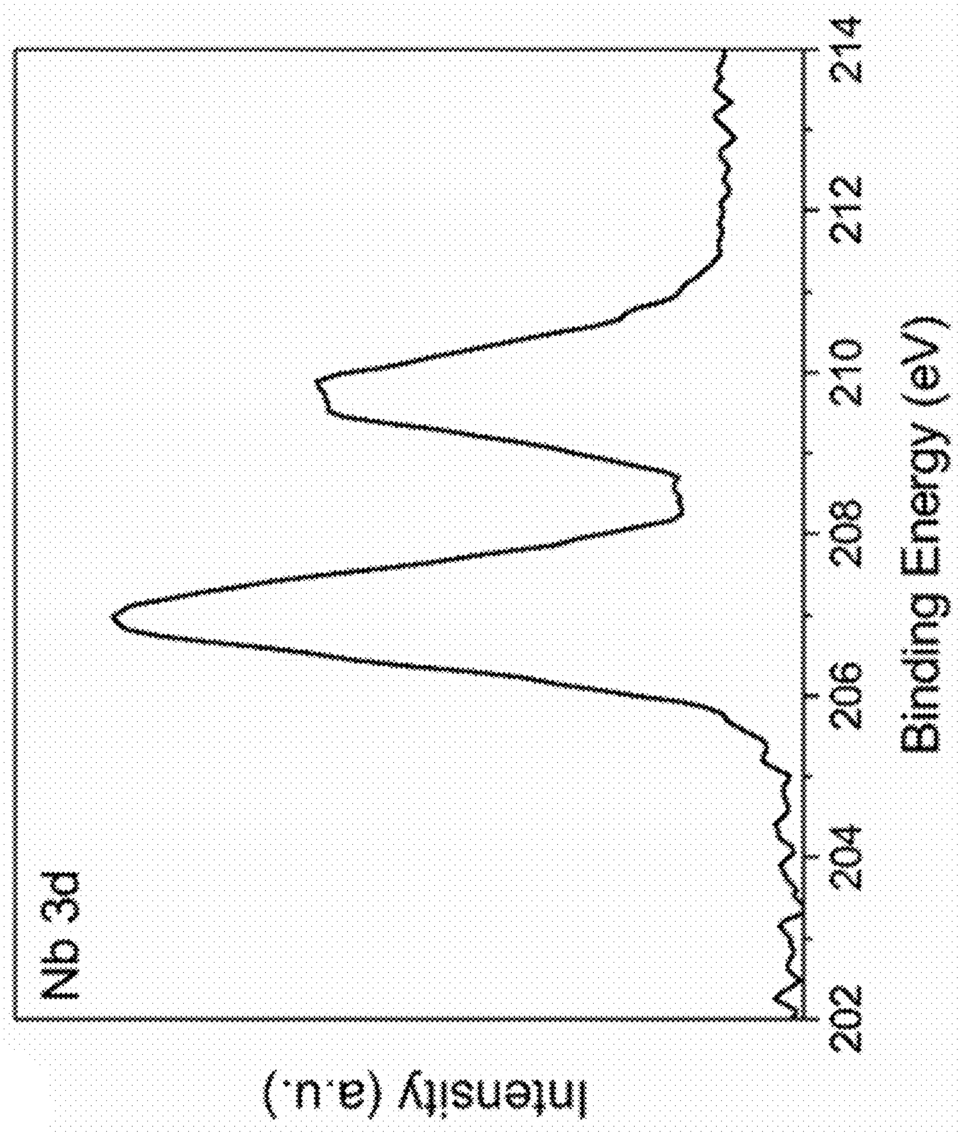
FIG. 12 shows an Nb 3d XPS spectra of 6 mol % Nb-modified ε-$VOPO_4$.

A series of Nb-modified samples with varying concentrations (x mol %, where x equals 1.2, 3.6, and 6) were prepared by sintering Nb pre-treated ε-$VOPO_4$ particles at 500° C. Elemental mapping by TEM-EDS microanalysis of the 6 mol % Nb-modified sample shows a homogenous distribution of V, P, and O throughout the particle, with Nb primarily localized on the surface. EDS line scan through the bulk of a single particle (represented by an arrow) reveals a nanometer-scale Nb-rich layer is present on the ε-$VOPO_4$ particle surface, as evidenced by a gradient in the Nb concentration from one edge of the particle surface to another (See FIG. 11, which shows an image 1100 of an EDS line scan along a line of a single 6 mol % Nb-modified ε-VOPO4 particle). XPS spectra display peaks at binding energies of 206.9 eV and 209.7 eV, corresponding to Nb 3d5/2 and Nb 3d3/2, respectively, which indicate $Nb^{5+}$ in the modified samples (See graph 1200 of FIG. 12, which shows an Nb 3D spectra for 6 mol % Nb-modified ε-$VOPO_4$).

Figure 13:
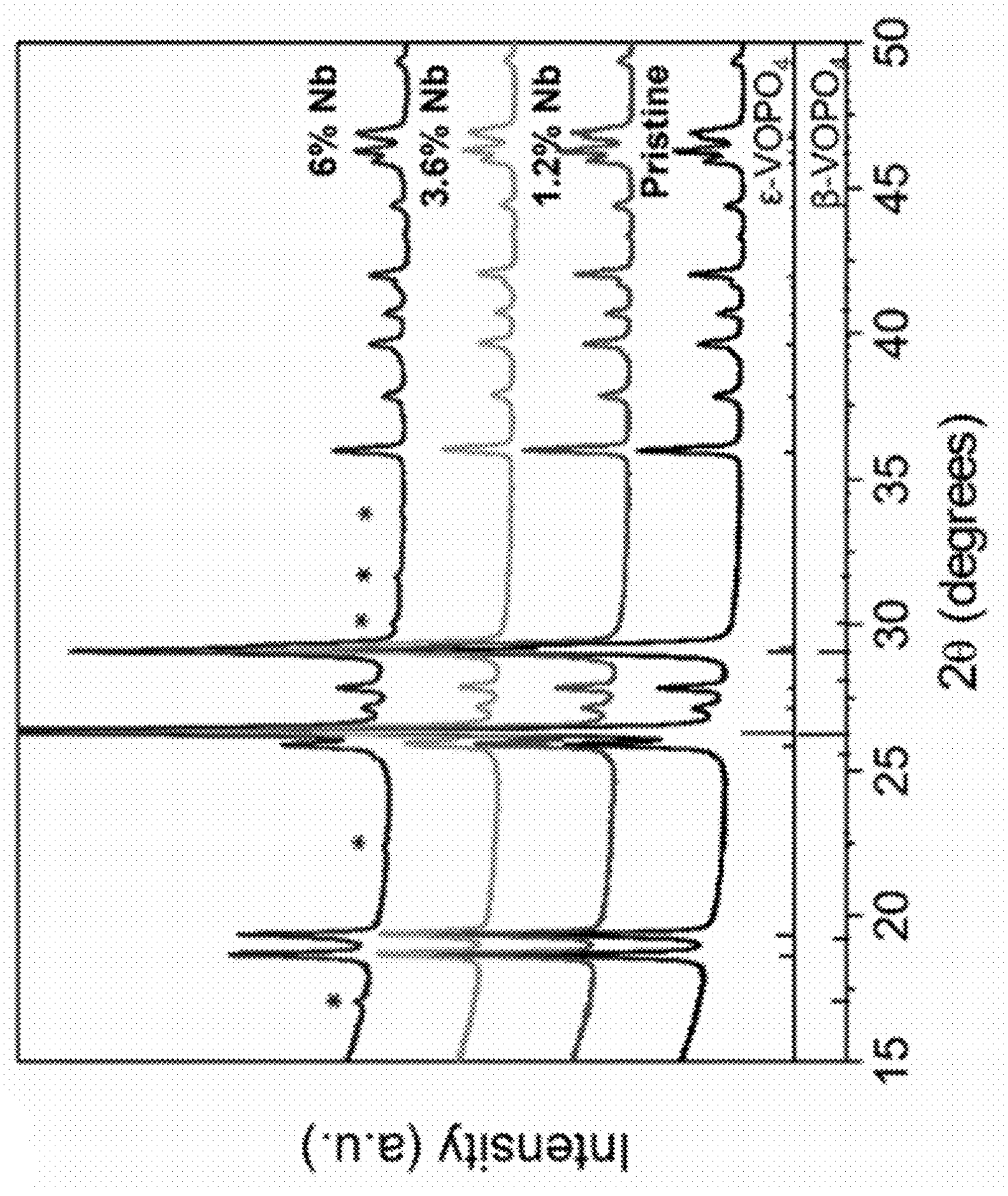
FIG. 13 shows XRD patterns of pristine and Nb-modified ε-$VOPO_4$.

XRD patterns of the pristine and Nb-modified samples are indexed to mostly monoclinic ε-$VOPO_4$ with the Cc space group (See graph 1300 of FIG. 13, which shows XRD patterns of pristine and Nb-modified ε-$VOPO_4$). The diffraction patterns of the modified samples containing up to 3.6 mol % Nb are purely ε-$VOPO_4$, but additional peaks corresponding to orthorhombic β-VOPO4 with Pnma space group (indicated by the *) appear with higher Nb content; the 6 mol % Nb-modified sample consists of 87.2 wt % ε-$VOPO_4$ and 12.8 wt % β-$VOPO_4$.

Figure 14:
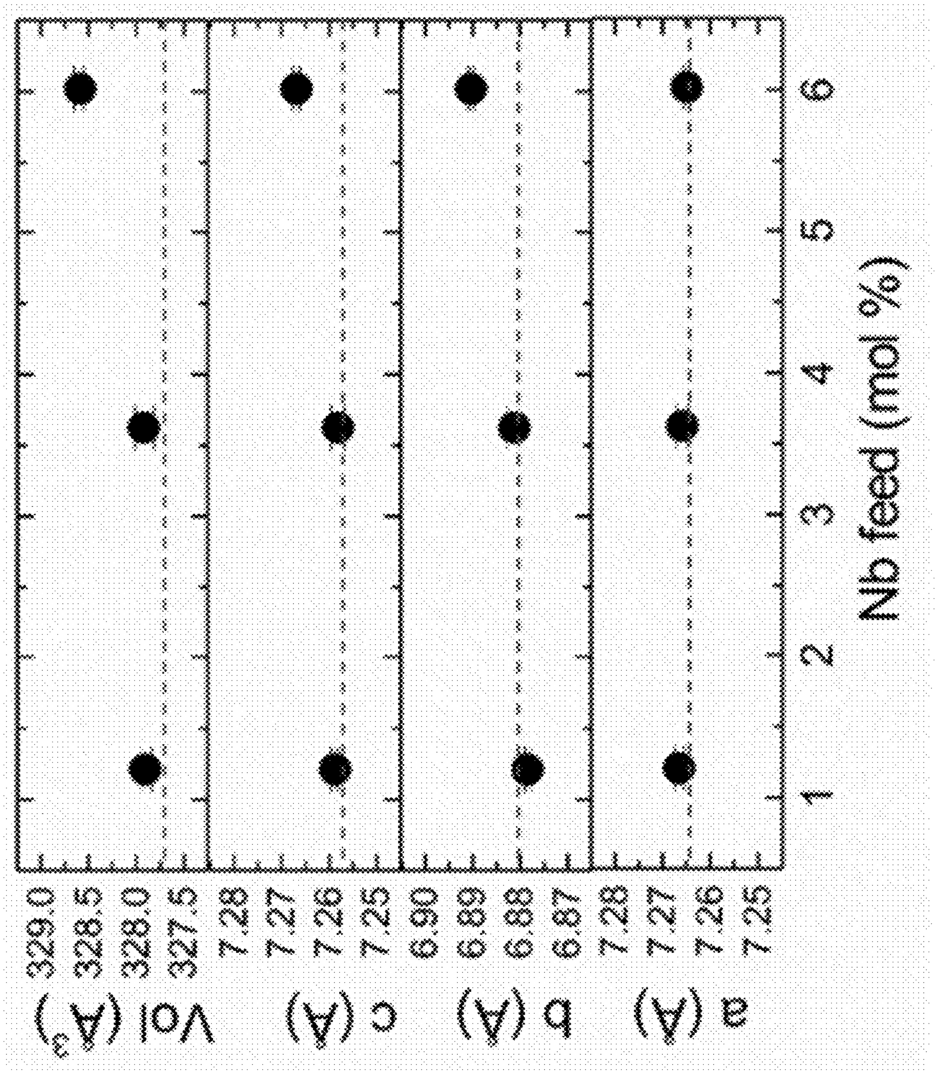
FIG. 14 shows unit cell lattice parameters of Nb-modified ε-$VOPO_4$ plotted as a function of Nb concentration, where the dashed lines correspond to the values of unmodified ε-$VOPO_4$ reheated to the same sintering temperature.

The refined lattice parameters and unit cell volume of pristine and Nb-modified samples are shown in graph 1400 of FIG. 14, which shows unit cell lattice parameters of Nb-modified ε-$VOPO_4$ plotted as a function of Nb concentration, where the dashed lines correspond to the values of unmodified ε-$VOPO_4$ reheated to the same sintering temperature. Error bars are also shown in FIG. 14. To isolate the effects solely attributed to Nb modification, pristine ε-$VOPO_4$ powders were also reheated at the sintering temperature to account for the temperature effect on the lattice. The cell parameters of the modified samples exhibit nominal changes up to 3.6 mol % Nb, suggesting that Nb ions do not substitute into the ε-$VOPO_4$ crystal structure. As the Nb concentration increases, lattice parameter a decreases as lattice parameters b and c increase, leading to a volume expansion of 0.27% by 6 mol % Nb modification. The observed volume expansion can be attributed to the larger ionic radius of $Nb^{5+}$ (0.64 Å) compared to $V^{5+}$ (0.54 Å), which suggests some incorporation of Nb ions into the lattice. In comparison, a more significant expansion of 0.40% was observed following 5 mol % Nb substitution of ε-$VOPO_4$. Therefore, partial Nb substitution is the most plausible for the 6 mol % Nb-modified sample. Additionally, the phase transformation after 6 mol % Nb modification may be explained by the partial substitution of Nb into the lattice that helps stabilize one vanadyl phosphate phase over the other.

Figure 15:
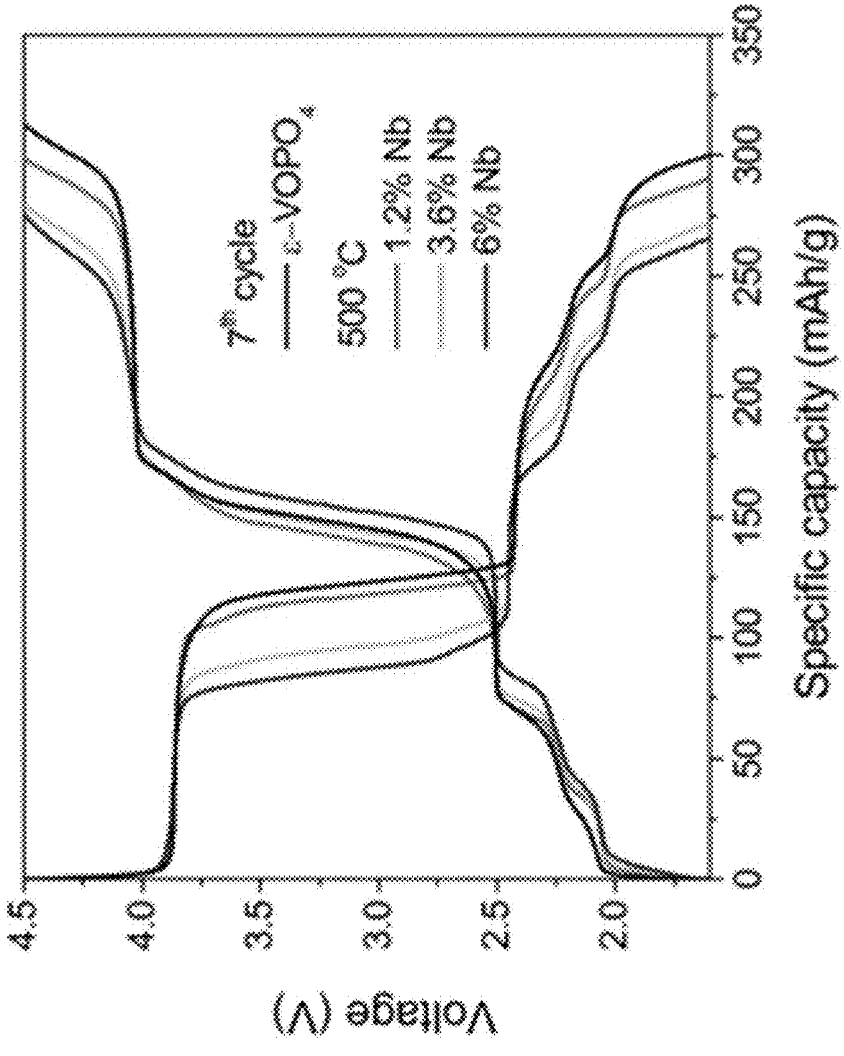
FIG. 15 shows galvanostatic charge-discharge curves for the 7th cycle of pristine and 1.2 mol %, 3.4 mol %, and 6 mol % Nb-modified ε-$VOPO_4$ cycled within 1.6 V-4.5 V at C/10 (C=2 Li).
Figure 16:
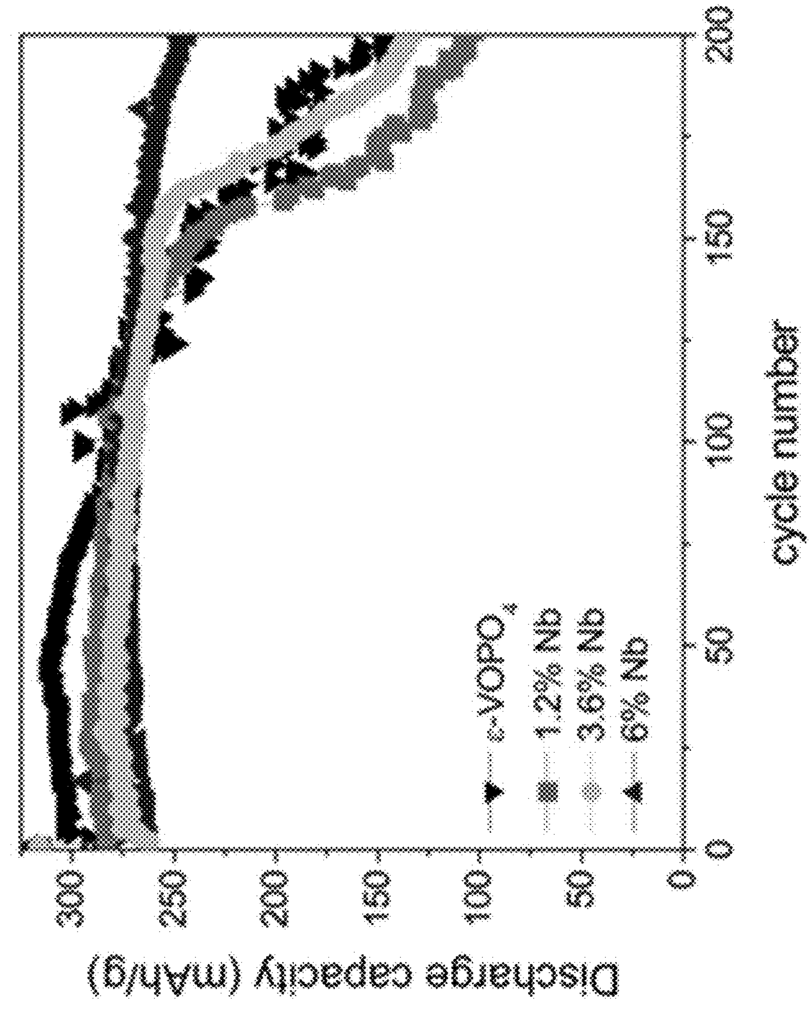
FIG. 16 shows cycle life of pristine and 1.2 mol %, 3.4 mol %, and 6 mol % Nb-modified ε-$VOPO_4$ cycled within 1.6 V-4.5 V at C/10 (C=2 Li).
Figure 17:
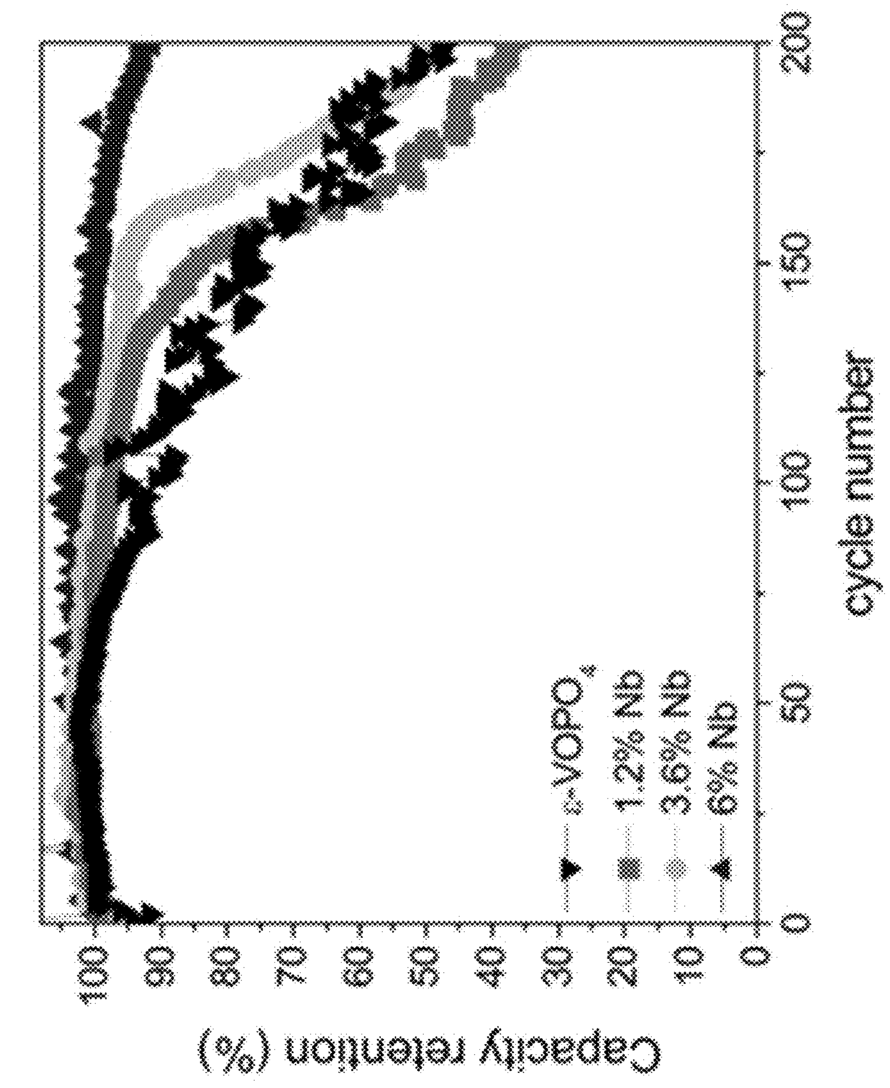
FIG. 17 shows Coulombic efficiency of pristine and 1.2 mol %, 3.4 mol %, and 6 mol % Nb-modified ε-$VOPO_4$ cycled within 1.6 V-4.5 V at C/10 (C=2 Li).

The electrochemical profiles of samples are characteristic of ε-$VOPO_4$, displaying a single, high-voltage plateau at ~4 V associated with the $V^{5+}/V^{4+}$ redox reaction and three small steps below 2.5 V associated with the $V^{4+}/V^{3+}$ redox reaction (See FIGS. 15-17). FIG. 15 shows a graph 1500 of galvanostatic charge-discharge curves for the 7th cycle of pristine and 1.2 mol %, 3.4 mol %, and 6 mol % Nb-modified ε-$VOPO_4$ cycled within 1.6 V-4.5 V at C/10 (C=2 Li). FIG. 16 shows a graph 1600 of the cycle life of pristine and 1.2 mol %, 3.4 mol %, and 6 mol % Nb-modified ε-$VOPO_4$ cycled within 1.6 V-4.5 V at C/10 (C=2 Li). FIG. 17 shows a graph 1700 of the Coulombic efficiency of pristine and 1.2 mol %, 3.4 mol %, and 6 mol % Nb-modified ε-$VOPO_4$ cycled within 1.6 V-4.5 Vat C/10 (C=2 Li).

Figure 18A:
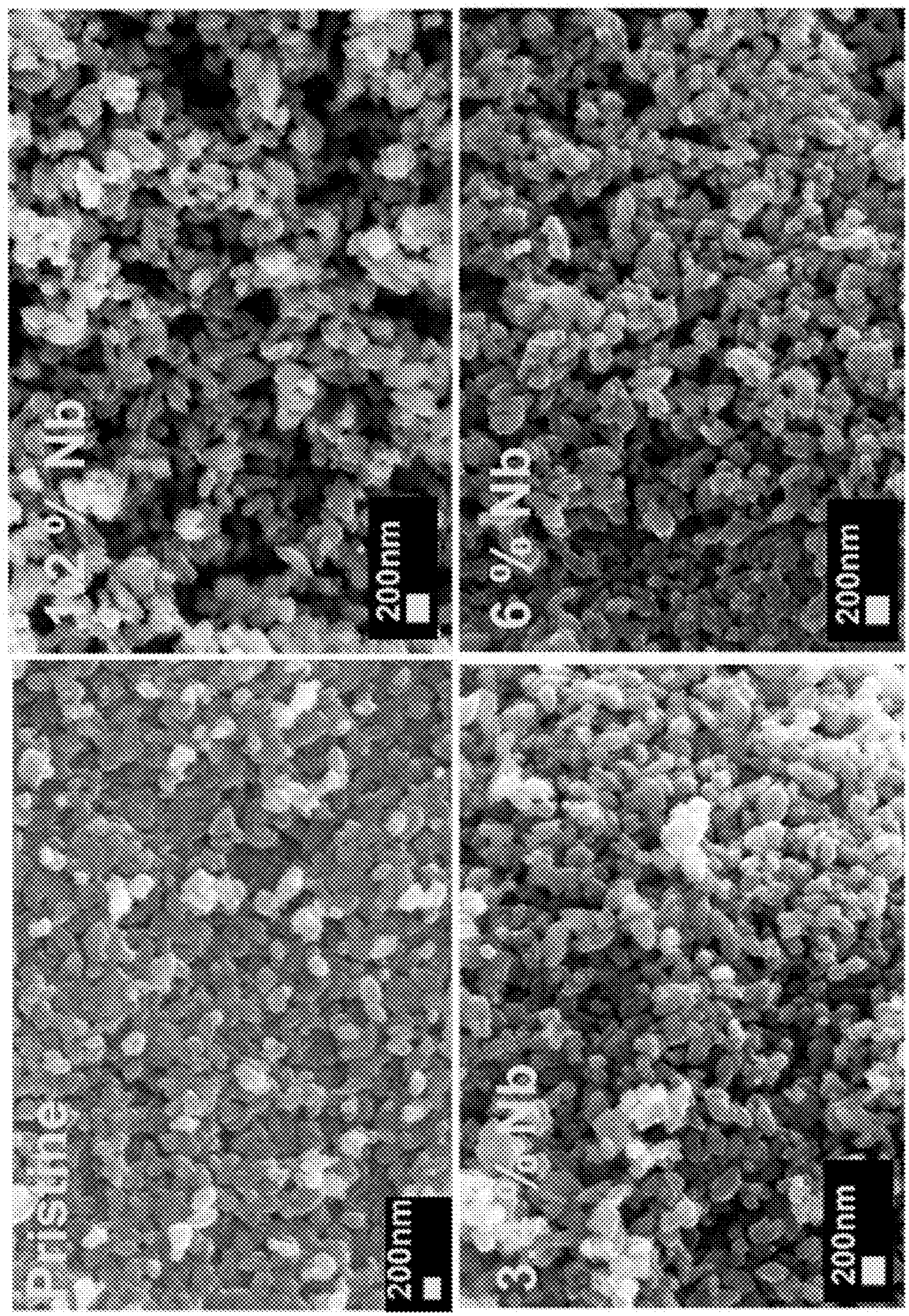
FIG. 18A shows SEM images of pristine and 1.2, 3.6, and 6 mol % Nb-modified ε-$VOPO_4$.

The pristine material delivers the theoretical capacity of 305 mAh/g. As Nb concentration increases, the capacity decreases due to the reduction of the high-voltage plateau (~4 V). The 1.2 mol %, 3.6 mol %, and 6 mol % Nb-modified samples reach capacities of 280 mAh/g, 275 mAh/g, and 270 mAh/g, respectively. Particle size is likely not responsible for the decrease in capacity since the Nb-modified samples consist of cuboid-shaped primary particles measuring approximately 100-200 nm (See FIG. 18A, which shows SEM images 1800, 1810, 1820, and 1830 of pristine and 1.2, 3.6, and 6 mol % Nb-modified ε-$VOPO_4$, respectively). ICP-OES measurements show that Nb/P amounts detected in the modified samples agree with the Nb feeding ratio but reveal the V/P ratios are less than expected. Therefore, the observed decrease in capacity after modification is attributed to the reduction of redox-active V. Some possible reasons for further capacity decrease with increasing Nb content may not only be from the partial substitution of inactive Nb but also related to the structural disorder in the modified samples. As shown in FIG. 13, the single-phase compound transforms into a mixture of ε-$VOPO_4$ and β-$VOPO_4$, in which the different diffusion pathways may complicate $Li^+$ transport and lead to some capacity loss.

Table 1 in FIG. 18B shows ICP-OES results of pristine and Nb-modified ε-$VOPO_4$. The modified samples demonstrate a substantial improvement in capacity retention compared to pristine ε-$VOPO_4$. While pristine and 1.2 mol % Nb-modified samples exhibit capacity fade after approximately 70 cycles, the modified samples with higher Nb content experiences a more gradual decay in capacity. By the 200th cycle, pristine ε-$VOPO_4$ maintains ~50% of its initial capacity, while the 6 mol % Nb modified sample retains 90% and outperforms all samples by better preserving its voltage characteristics. Similarities in the performance between pristine and the modified material with lower Nb content suggest 1.2 mol % Nb may be insufficient to induce changes on the surface/sublayer of ε-$VOPO_4$ particles, or the temperature required to achieve the same degree of modification may vary with different Nb concentrations.

Figure 19:
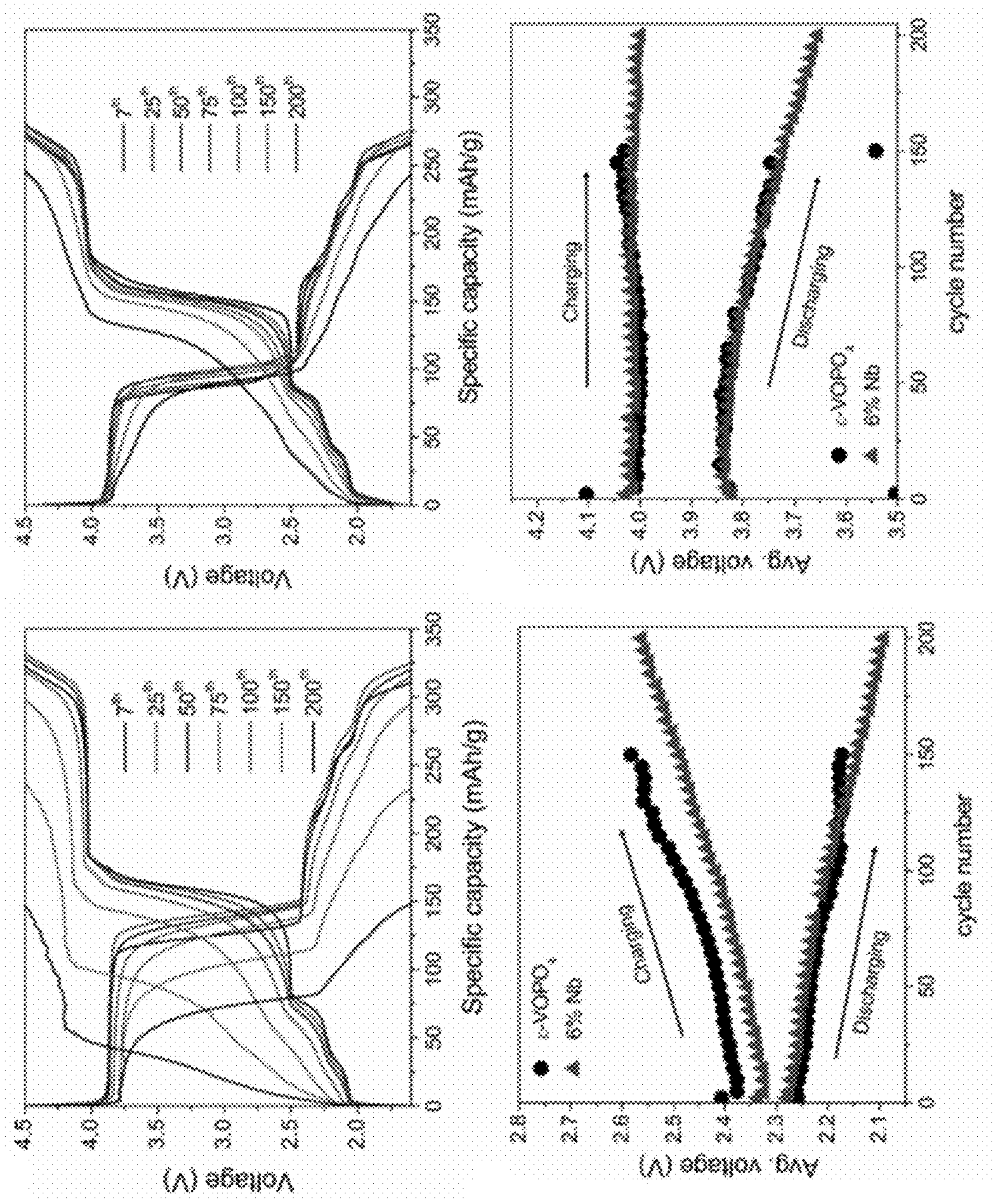
FIG. 19 shows the galvanostatic charge-discharge curves of pristine and 6 mol % Nb-modified ε-$VOPO_4$ and the calculated average voltages in the low-(1.6 V-3.0 V) and high-voltage (3.0 V-4.5 V) regions.

The effect of Nb modification on voltage fading was examined by calculating the average charge and discharge voltages in the low-(1.6 V-3.0 V) and high-voltage (3.0 V-4.5 V) regions using the galvanostatic tests shown in graphs 1900 and 1910 of FIG. 19, which shows galvanostatic charge-discharge curves of pristine and 6 mol % Nb-modified ε-$VOPO_4$ and the calculated average voltages in the low-(1.6 V-3.0 V) and high-voltage (3.0 V-4.5 V) regions. Generally, both samples show similar initial average voltages and degrees of voltage fading (See graphs 1920 and 1930 of FIG. 19). However, the Nb-modified sample shows a slightly lower initial average charge voltage than pristine ε-$VOPO_4$, with a difference of 50 mV. This may be attributed to a phase transformation occurring on the surface of the active material after Nb modification, which may not be detectable by XRD. During the initial cycles, both samples experience comparable voltage fading. However, the average charge voltage of pristine ε-$VOPO_4$ deviates from the linear increase with increasing cycle number, confirming the galvanostatic data that indicated larger polarization for the pristine ε-$VOPO_4$ compared to the Nb-modified sample after 100 cycles (See graphs 1900 and 1910 of FIG. 19).

Figure 20:
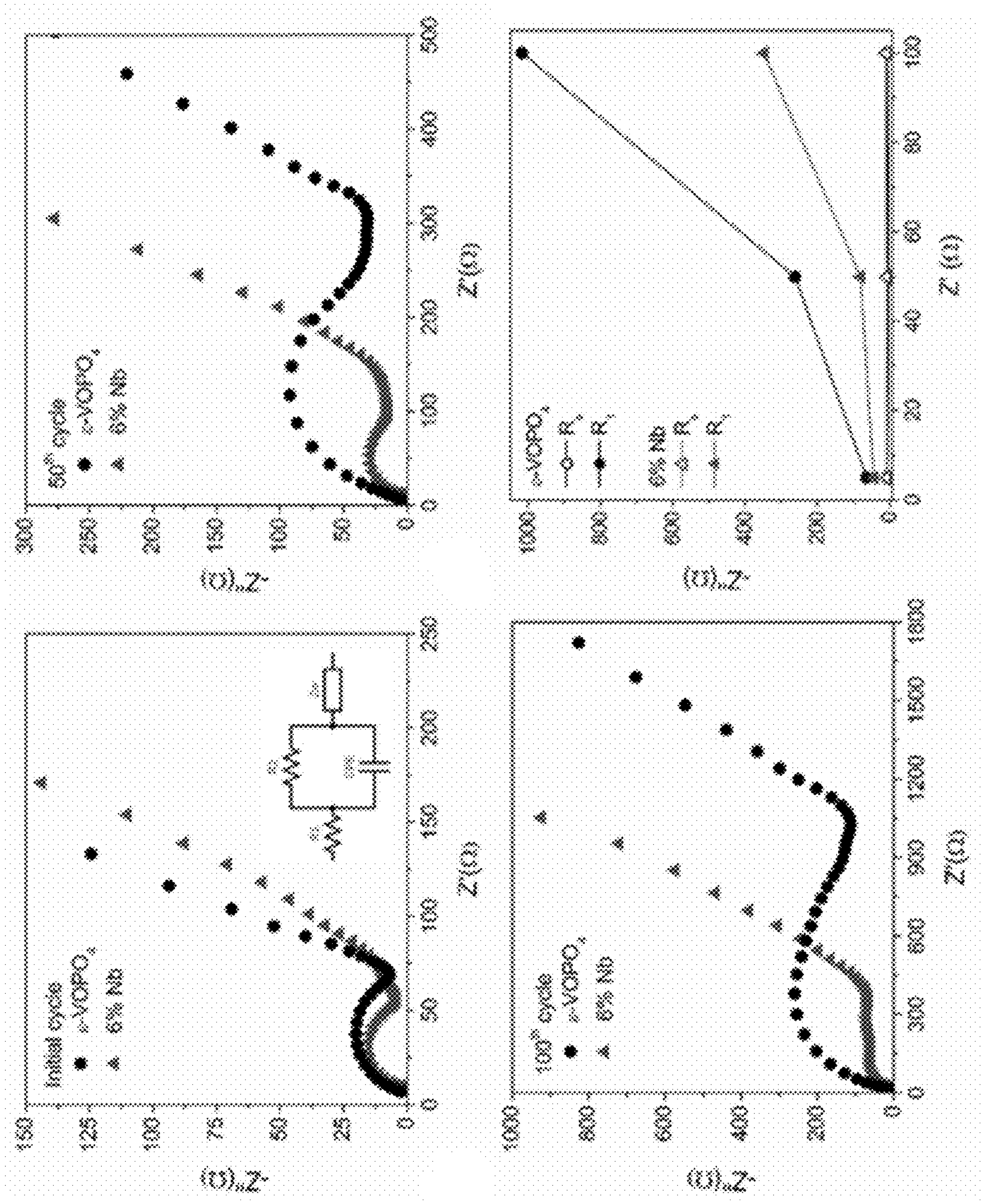
FIG. 20 shows impedance spectra of pristine and 6 mol % Nb-modified ε-$VOPO_4$ conducted after the initial, 50th, and 100th cycle at the end of discharge after cycling within 1.6 V-4.5 V at C/10 (C=2 Li).

FIG. 20 shows impedance spectra of pristine and 6 mol % Nb-modified ε-$VOPO_4$ conducted after the initial, 50th, and 100th cycle at the end of discharge after cycling within 1.6 V-4.5 Vat C/10 (C=2 Li). The impedance spectra of ε-$VOPO_4$ are presented in graphs 2000, 2010, and 2020 of FIG. 20.

In the initial cycle, the semicircle diameter of the Nb-modified sample is slightly smaller than that of pristine ε-$VOPO_4$ (See FIG. 20), indicating reduced interfacial charge resistance after Nb modification. The difference between the two samples becomes more pronounced with increasing cycle number; after 100 cycles, the diameter of pristine ε-$VOPO_4$ increases more substantially than the Nb-modified sample, suggesting that Nb modification suppresses the growth of cell impedance. These findings align with the cycling data demonstrating improved cycling performance after Nb modification (See FIG. 17). The observed delayed resistance growth of the Nb-modified sample may be attributed to either a combination of Nb substitution or an Nb-rich layer identified by TEM, or both (See FIG. 11). This layer likely acts as a barrier, limiting parasitic reactions with the electrolyte or enhancing ionic conductivity at the interface.

Figure 21:
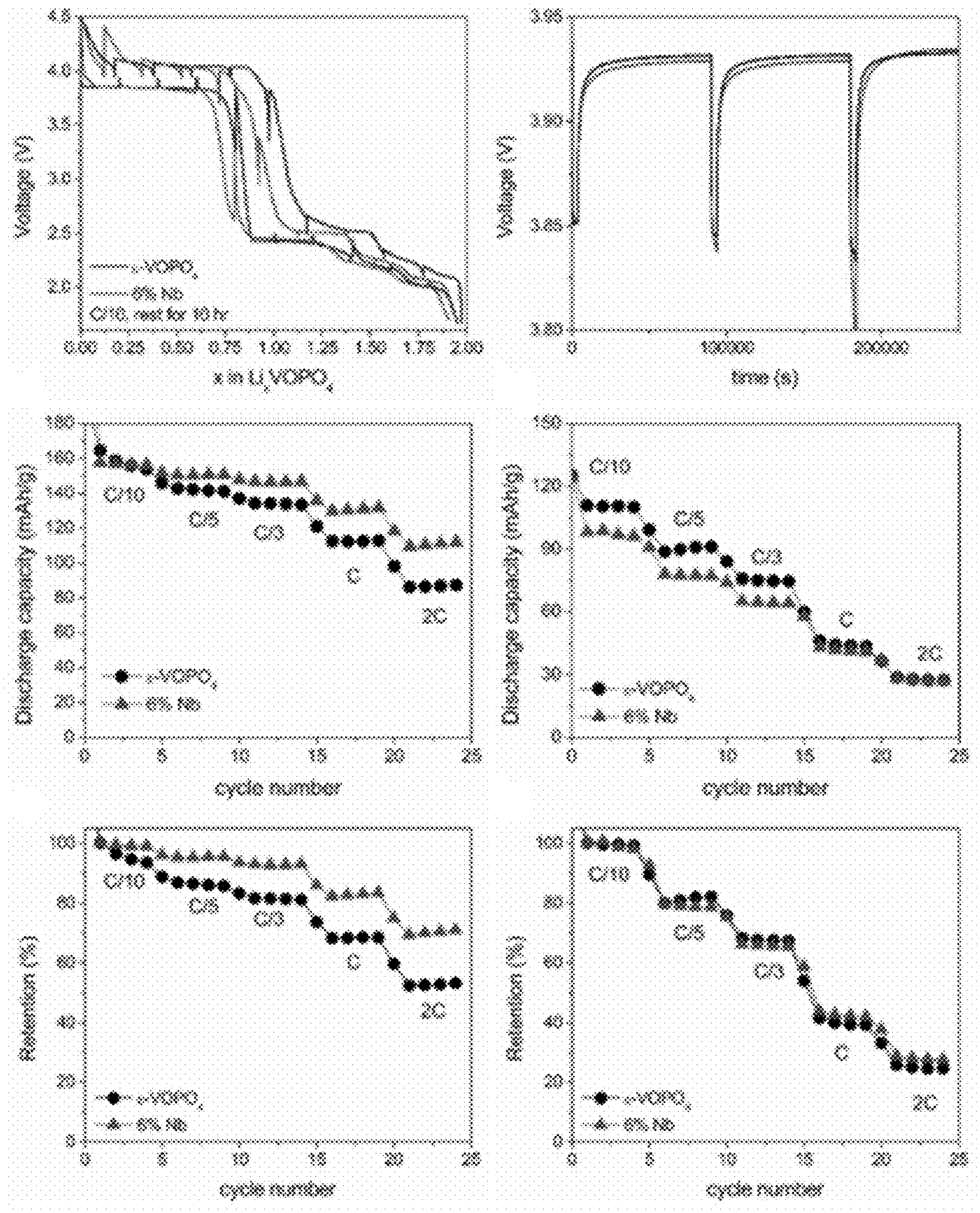
FIG. 21 shows the galvanostatic intermittent titration technique (GITT) and rate performance tests of pristine and 6 mol % Nb-modified ε-$VOPO_4$. GITT measurements of the initial cycle within 1.6 V-4.5 V and time-voltage profile within the high-voltage (3.0 V-4.5 V) region, as well as rate performance tests and corresponding retention rates within the low-voltage (1.6 V-3.0 V) and high-voltage (3.0 V-4.5 V) regions.

FIG. 21 shows galvanostatic intermittent titration technique (GITT) and rate performance tests of pristine and 6 mol % Nb-modified ε-$VOPO_4$. GITT measurements of the initial cycle within 1.6 V-4.5 V and time-voltage profile within the high-voltage (3.0 V-4.5 V) region, as well as rate performance tests and corresponding retention rates within the low-voltage (1.6 V-3.0 V) and high-voltage (3.0 V-4.5 V) regions. The impact of Nb modification on the thermodynamics and kinetics of ε-$VOPO_4$ was assessed through GITT measurements of the pristine and 6 mol % Nb-modified samples (See graphs 2100 and 2110 of FIG. 21). In the low-voltage region of 1.6 V-3.0 V, the Nb-modified sample demonstrates reduced polarization and overpotential compared to pristine ε-$VOPO_4$. A reduction in cell polarization after Nb modification from 184 mV to 80 mV is attributed to a lower potential during the charging process. Additionally, the Nb-modified sample exhibits a slightly smaller overpotential (42 mV for 6 mol % Nb vs. 50 mV for pristine), suggesting improvements in the low-voltage kinetics of ε-$VOPO_4$. On the other hand, both samples demonstrate similar overpotential and cell polarization in the high-voltage region of 3.0 V-4.5 V, implying that Nb modification does not notably affect the high-voltage redox reactions.

Rate performance tests were conducted to validate the GITT results (See graphs 2120, 2130, 2140, and 2150 of FIG. 21). When cycled within the low-voltage region (1.6 V-3.0 V) at C/10, both the pristine and Nb-modified samples reach similar capacities. However, at a faster C-rate of 2 C, the 6 mol % Nb-modified sample maintains 70% of its C/10 capacity, while the pristine sample retains only around 55%, confirming the improved low-voltage rate capabilities of Nb-modified ε-$VOPO_4$. When cycled within the high-voltage region (3.0 V-4.5 V) at C/10, pristine ε-$VOPO_4$ achieves a higher capacity than the modified sample, consistent with the reduction of the 4 V plateau observed after Nb modification (See FIG. 15). However, as shown in graph 2150 of FIG. 21, both samples retain the capacities similarly at faster C-rates, with the Nb-modified sample marginally outperforming the pristine sample when C-rate≥1 C. These results, along with the findings from GITT measurements and voltage-fade analysis, demonstrate that Nb modification significantly enhances the low-voltage rate capabilities while having no notable impact on the performance in the high-voltage region.

Throughout this description all ranges described include all values and sub-ranges therein, unless otherwise specified. Additionally, the indefinite article "a" or "an" carries the meaning of "one or more" throughout the description, unless otherwise specified. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A lithium battery, comprising:

a cathode formed with ε-$VOPO_4$ particles modified to comprise a component having unit cell properties different from unmodified ε-$VOPO_4$, wherein ε-$VOPO_4$ within the ε-$VOPO_4$ particles has a dual lithium ion exchange characteristic, and wherein the cathode has a capacity of at least 260 mAh/g at a discharge rate of C/20; and a lithium metal anode.

2. The lithium battery of claim 1, wherein the ε-$VOPO_4$ cathode has a capacity of at least 275 mAh/g at a discharge rate of C/20.

3. The lithium battery of claim 1, wherein the ε-$VOPO_4$ cathode has a capacity of at least 285 mAh/g at a discharge rate of C/20.

4. The lithium battery of claim 1, wherein the modified ε-$VOPO_4$ particles within the cathode have a niobium concentration that exceeds 1.0 mol %.

5. The lithium battery of claim 1, wherein the modified ε-$VOPO_4$ particles within the cathode have a niobium concentration that exceeds 3.6 mol %.

6. The lithium battery of claim 1, wherein the modified ε-$VOPO_4$ particles within the cathode have a niobium concentration that exceeds 6.0 mol %.

7. The lithium battery of claim 1, wherein the ε-$VOPO_4$ particles are solvothermally or hydrothermally generated.

8. A lithium battery, comprising:

a cathode formed with ε-$VOPO_4$ particles having a partial substitution of niobium for vanadium, wherein the ε-$VOPO_4$ has a dual lithium ion exchange characteristic, and wherein the cathode has a capacity of at least 260 mAh/g at a discharge rate of C/20;

an anode; and an electrolyte.

9. The lithium battery of claim 8, wherein the ε-$VOPO_4$ particles having the partial substitution of niobium for vanadium comprise ethanol-solvent solvothermally generated ε-$VOPO_4$ particles, modified by treatment with niobium ethoxide in an ethanol solvent.

10. The lithium battery of claim 8, wherein the ε-$VOPO_4$ particles having the partial substitution of niobium for vanadium have a capacity of at least 275 mAh/g at a discharge rate of C/20.

11. The lithium battery of claim 8, wherein the ε-$VOPO_4$ particles having the partial substitution of niobium for vanadium have a capacity of at least 285 mAh/g at a discharge rate of C/20.

12. The lithium battery of claim 8, wherein the ε-$VOPO_4$ particles having the partial substitution of niobium for vanadium have a niobium concentration that exceeds 1.0 mol %.

13. The lithium battery of claim 8, wherein the ε-$VOPO_4$ particles having the partial substitution of niobium for vanadium have a niobium concentration that exceeds 3.6 mol %.

14. The lithium battery of claim 8, wherein the ε-$VOPO_4$ particles having the partial substitution of niobium for vanadium have a niobium concentration that exceeds 6.0 mol %.

15. The lithium battery of claim 8, further comprising a lithium salt in the electrolyte, wherein the anode comprises lithium metal, and the cathode comprises lithiated ε-$VOPO_4$ particles having the partial substitution of niobium for vanadium.

16. The lithium battery of claim 8, wherein the ε-$VOPO_4$ particles having the partial substitution of niobium for vanadium are derived from solvothermally or hydrothermally generated ε-$VOPO_4$ particles which are modified with niobium.

17. A lithium battery, comprising:

a cathode formed with ε-$VOPO_4$ particles modified to comprise a first unmodified ε-$VOPO_4$ component and a second component having unit cell properties different from unmodified ε-$VOPO_4$, wherein the ε-$VOPO_4$ particles have a dual lithium ion exchange characteristic, and wherein the cathode has a capacity of at least 260 mAh/g at a discharge rate of C/20;

an anode; and an electrolyte.

18. The lithium battery of claim 17, wherein the ε-$VOPO_4$ particles are modified with niobium.

19. The lithium battery of claim 18, wherein the cathode has a niobium concentration that exceeds 3.6 mol %.

20. The lithium battery of claim 18, wherein the cathode has a niobium concentration that exceeds 6.0 mol %.

21. The lithium battery of claim 17, wherein the ε-$VOPO_4$ particles are solvothermally or hydrothermally generated as unmodified ε-$VOPO_4$ and then modified to comprise the first unmodified ε-$VOPO_4$ component and the second component having unit cell properties different from the unmodified ε-$VOPO_4$.

* * * * *